(12) United States Patent
Yuan et al.

(10) Patent No.: US 12,308,920 B2
(45) Date of Patent: May 20, 2025

(54) COUNTING ACTIVE REFERENCE SIGNALS FOR A JOINT CHANNEL STATE INFORMATION REPORT

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Mostafa Khoshnevisan, San Diego, CA (US); Tao Luo, San Diego, CA (US); Jing Sun, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 18/261,637

(22) PCT Filed: Mar. 9, 2021

(86) PCT No.: PCT/CN2021/079680
§ 371 (c)(1),
(2) Date: Jul. 14, 2023

(87) PCT Pub. No.: WO2022/188017
PCT Pub. Date: Sep. 15, 2022

(65) Prior Publication Data
US 2024/0080080 A1    Mar. 7, 2024

(51) Int. Cl.
*H04B 7/06* (2006.01)
*H04W 24/10* (2009.01)

(52) U.S. Cl.
CPC .......... *H04B 7/0628* (2013.01); *H04W 24/10* (2013.01)

(58) Field of Classification Search
CPC ............................ H04B 7/0628; H04W 24/10
See application file for complete search history.

(56) References Cited

U.S. PATENT DOCUMENTS

| 10,958,326 | B2 * | 3/2021 | Rahman | ............... H04L 5/0048 |
| 2018/0062724 | A1 * | 3/2018 | Onggosanusi | ....... H04B 7/0421 |

(Continued)

FOREIGN PATENT DOCUMENTS

| CN | 107231656 A | 10/2017 |
| CN | 109151887 A | 1/2019 |

(Continued)

OTHER PUBLICATIONS

International Search Report and Written Opinion—PCT/CN2021/079680—ISA/EPO—Nov. 26, 2021.

(Continued)

*Primary Examiner* — Freshteh N Aghdam
(74) *Attorney, Agent, or Firm* — Holland & Hart LLP/Qualcomm

(57) ABSTRACT

Methods, systems, and devices for wireless communication are described. A user equipment (UE) may transmit, to a base station, a capability report that includes an indication of a maximum number of reference signal resources within a transmission time interval (TTI) for which the UE supports channel state information (CSI) reporting. The maximum number of reference signal resources may be based on a capability for supporting joint CSI reporting for both a downlink and an uplink. The UE may receive, from the base station, a report configuration in response to the capability report. Subsequently, the base station may transmit reference signals to the UE, which the UE may use to determine CSI for both the downlink and the uplink. The UE may then (Continued)

transmit, to the base station, a CSI report including the CSI for both the downlink and the uplink, in accordance with the report configuration.

30 Claims, 17 Drawing Sheets

(56) References Cited

U.S. PATENT DOCUMENTS

| | | | | |
|---|---|---|---|---|
| 2020/0119797 A1* | 4/2020 | Wang | ............... | H04B 7/0632 |
| 2023/0171623 A1* | 6/2023 | Zeineddine | ......... | H04L 5/0035 |
| | | | | 370/252 |

FOREIGN PATENT DOCUMENTS

| | | | |
|---|---|---|---|
| WO | WO-2018044116 A1 | | 3/2018 |
| WO | WO-2018142380 A1 | | 8/2018 |
| WO | WO-2019029689 A1 | | 2/2019 |
| WO | WO-2019103580 A1 | | 5/2019 |
| WO | WO-2020249119 A1 | | 12/2020 |
| WO | WO-2021030956 A1 | * | 2/2021 |

OTHER PUBLICATIONS

LG Electronics: "Feature Lead Summary#4 of Enhancements on Multi-beam Operations", 3GPP TSG RAN WG1 Meeting #98, R1-1909779, R1#98 Fl_Summary_Multibeam(MBI) V8, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019, pp. 1-38, XP051766371, pp. 1,2, item [17], proposal 5,6, p. 33.

Moderator (AT&T): "Summary of Email Discussion/approval [103-e-NR-UEFeatures-eMIMO-01]", 3GPP TSG RAN WG1 #103-e, R1-2009348, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020, 17 Pages, XP051954226, pp. 2,3.

Supplementary European Search Report—EP21929499—Search Authority—Munich—Nov. 12, 2024.

* cited by examiner

COUNTING ACTIVE REFERENCE SIGNALS FOR A JOINT CHANNEL STATE INFORMATION REPORT

CROSS REFERENCE

The present Application is a 371 national stage filing of International PCT Application No. PCT/CN2021/079680 by YUAN et al. entitled "COUNTING ACTIVE REFERENCE SIGNALS FOR A JOINT CHANNEL STATE INFORMATION REPORT," filed Mar. 9, 2021, which is assigned to the assignee hereof, and which is expressly incorporated by reference in its entirety herein.

FIELD OF TECHNOLOGY

The following relates to wireless communication, including counting active reference signals for a joint channel state information (CSI) report.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for joint channel state information (CSI) reporting for downlink and uplink. Generally, the described techniques provide for configuring a communication device, such as a user equipment (UE) to count a number of active reference signal resources for a joint CSI report. The UE may transmit a UE capability report that indicates a maximum number of active reference signal resources (e.g., channel state information-reference signal (CSI-RS) resources, CSI-RS ports, synchronization signal blocks (SSBs)) within a transmission time interval (TTI) (e.g., a slot) for supporting the joint CSI reporting for downlink and uplink. The UE may count the number of active reference signal resources for a CSI report with joint reporting of downlink and uplink as described herein.

For example, each active reference signal resource (e.g., each CSI-RS resource, each CSI-RS port, or each SSB) of the maximum number of active reference signal resources for the CSI report may be counted as at least one count. In some other examples, each active reference signal resource (e.g., each CSI-RS resource, each CSI-RS port, or each SSB) of the maximum number of active reference signal resources for the CSI report may be counted as at least two counts, for example, one count for downlink and one count for uplink. In other examples, the count for the uplink may be based on a maximum number of uplink information to be reported, or a maximum uplink information set to be reported, as described herein. By providing an indication in the UE capability report of the maximum number of active reference signal resources to support joint CSI reporting for downlink and uplink, the described techniques may promote higher reliability and lower latency wireless communications, among other benefits.

A method for wireless communication at a UE is described. The method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink, receiving, from the base station, a report configuration in response to the UE capability report, determining CSI for both the downlink and the uplink based on receiving one or more reference signals, and transmitting, to the base station, a CSI report including the CSI for both the downlink and the uplink, in accordance with the report configuration.

An apparatus for wireless communication is described. The apparatus may include a processor, memory coupled with the processor, and instructions stored in the memory. The instructions may be executable by the processor to cause the apparatus to transmit, to a base station, a capability report that includes an indication of a maximum number of reference signal resources within a TTI for which the apparatus supports CSI reporting, the maximum number of reference signal resources being based on a capability for supporting joint CSI reporting for both a downlink and an uplink, receive, from the base station, a report configuration in response to the capability report, determine CSI for both the downlink and the uplink based on receiving one or more reference signals, and transmit, to the base station, a CSI report including the CSI for both the downlink and the uplink, in accordance with the report configuration.

Another apparatus for wireless communication is described. The apparatus may include means for transmitting, to a base station, a capability report that includes an indication of a maximum number of reference signal resources within a TTI for which the apparatus supports CSI reporting, the maximum number of reference signal resources being based on a capability for supporting joint CSI reporting for both a downlink and an uplink, means for receiving, from the base station, a report configuration in response to the capability report, means for determining CSI for both the downlink and the uplink based on receiving one or more reference signals, and means for transmitting, to the base station, a CSI report including the CSI for both the downlink and the uplink, in accordance with the report configuration.

A non-transitory computer-readable medium storing code for wireless communication at a UE is described. The code may include instructions executable by a processor to transmit, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink, receive, from the base station, a report configuration in response to the UE capability report, determine CSI for both the downlink and the uplink based on receiving one or more reference signals, and transmit, to the base station, a CSI report including the CSI for both the downlink and the uplink, in accordance with the report configuration.

Some examples of the method, apparatuses, and non-transitory computer-readable medium described herein may further include operations, features, means, or instructions for assigning at least one count for each reference signal resource of the report configuration associated with the joint CSI reporting for both the downlink and the uplink.

Some examples of the method, apparatuses, and non-transitory computer-readable medium described herein may further include operations, features, means, or instructions for assigning at least two counts for each reference signal resource of the report configuration associated with the joint CSI reporting for both the downlink and the uplink, where a first count of the at least two counts corresponds to the downlink and a second count of the at least two counts corresponds to the uplink.

In some examples of the method, apparatuses, and non-transitory computer-readable medium described herein, the second count may be based on an amount of uplink information to be reported in the CSI report.

In some examples of the method, apparatuses, and non-transitory computer-readable medium described herein, the amount of uplink information to be reported in the CSI report corresponds to a number of antenna panels and the method, apparatuses, and non-transitory computer-readable medium may include further operations, features, means, or instructions for assigning at least one count for each antenna panel of the number of antenna panels based at least in part on the amount of uplink information, and determining a total count based on the assigning of the at least one count for each antenna panel of the number of antenna panels, where the second count includes the total count.

In some examples of the method, apparatuses, and non-transitory computer-readable medium described herein, the second count may be based on a set of uplink information to be reported in the CSI report.

In some examples of the method, apparatuses, and non-transitory computer-readable medium described herein, the set of uplink information to be reported in the CSI report corresponds to one or more antenna panels of a set of antenna panels and the method, apparatuses, and non-transitory computer-readable medium may include further operations, features, means, or instructions for assigning at least one count for each antenna panel or a combination of antenna panels of the set of antenna panels based on the set of uplink information to be reported in the CSI report and determining a total count based on the assigning of the at least one count for each antenna panel or the combination of antenna panels of the set of antenna panels, where the second count includes the total count.

In some examples of the method, apparatuses, and non-transitory computer-readable medium described herein, the maximum number of reference signal resources includes CSI-RS resources, reference signal ports, or both, for the downlink and the uplink.

In some examples of the method, apparatuses, and non-transitory computer-readable medium described herein, the maximum number of reference signal resources includes SSB resources for the downlink and the uplink.

In some examples of the method, apparatuses, and non-transitory computer-readable medium described herein, the maximum number of reference signal resources supported by the UE may be for joint CSI reporting for both the downlink and the uplink on a per component carrier basis or on a per radio frequency spectrum band basis.

In some examples of the method, apparatuses, and non-transitory computer-readable medium described herein, the maximum number of reference signal resources supported by the UE may be for joint CSI reporting for both the downlink and the uplink across a set of component carriers or across a set of radio frequency spectrum bands.

A method for wireless communication at a base station is described. The method may include receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink, transmitting, to the UE, a report configuration based on the UE capability report, and receiving, from the UE, a CSI report including the CSI for both the downlink and the uplink, in accordance with the report configuration.

An apparatus for wireless communication at a base station is described. The apparatus may include a processor, memory coupled with the processor, and instructions stored in the memory. The instructions may be executable by the processor to cause the apparatus to receive, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink, transmit, to the UE, a report configuration based on the UE capability report, and receive, from the UE, a CSI report including the CSI for both the downlink and the uplink, in accordance with the report configuration.

Another apparatus for wireless communication at a base station is described. The apparatus may include means for receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink, means for transmitting, to the UE, a report configuration based on the UE capability report, and means for receiving, from the UE, a CSI report including the CSI for both the downlink and the uplink, in accordance with the report configuration.

A non-transitory computer-readable medium storing code for wireless communication at a base station is described. The code may include instructions executable by a processor to receive, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink, transmit, to the UE, a report configuration based on the UE capability report, and receive, from the UE, a CSI report including the CSI for both the downlink and the uplink, in accordance with the report configuration.

In some examples of the method, apparatuses, and non-transitory computer-readable medium described herein, the maximum number of reference signal resources includes CSI-RS resources, or reference signal ports, or both, for the downlink and the uplink.

In some examples of the method, apparatuses, and non-transitory computer-readable medium described herein, the maximum number of reference signal resources includes SSB resources for the downlink and the uplink.

In some examples of the method, apparatuses, and non-transitory computer-readable medium described herein, the maximum number of reference signal resources supported by the UE may be for joint CSI reporting for both the downlink and the uplink on a per component carrier basis or on a per radio frequency spectrum band basis.

In some examples of the method, apparatuses, and non-transitory computer-readable medium described herein, the maximum number of reference signal resources supported by the UE may be for joint CSI reporting for both the downlink and the uplink across a set of component carriers or across a set of radio frequency spectrum bands.

DETAILED DESCRIPTION

Figure 1:
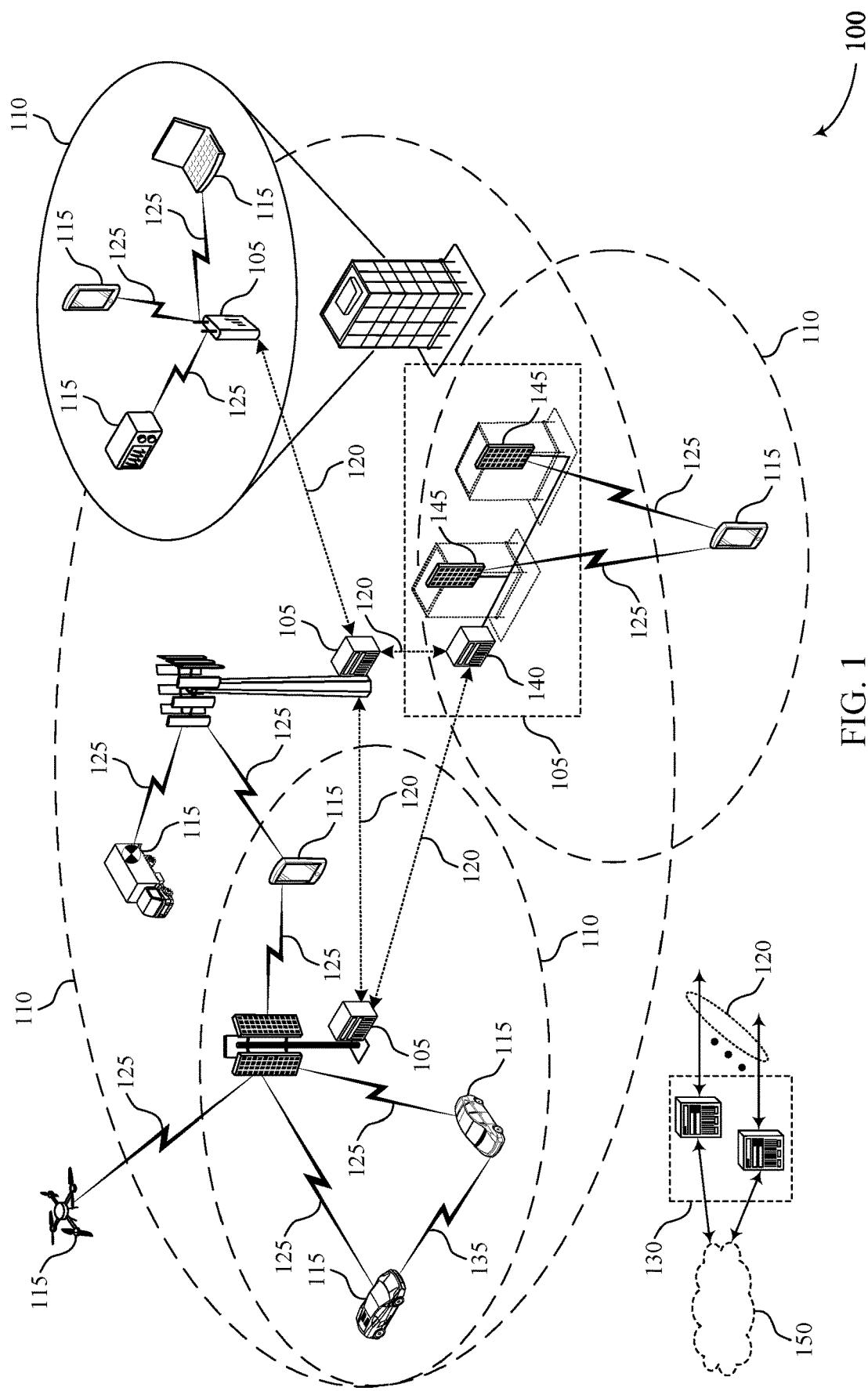
FIGS. 1 and 2 illustrate examples of wireless communications systems that support counting active reference signals for a joint channel state information (CSI) report in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. The UE may be configured to support beamformed communications via directional beams. For example, the UE may be configured with multiple antenna panels to support the beamformed communications. In some cases, to maintain a reliability of the beamformed communications, the UE may be configured with a report configuration, such as a channel state information (CSI) report configuration.

The CSI report configuration may provide various resource settings including various reference signal resources (e.g., reference signal resources, such as channel state information reference signals (CSI-RS) resources, or synchronization signal block (SSB) resources), which the UE may select and use to generate a CSI report based on channel and interference measurements performed in accordance with the selected resource setting. In some cases, if a reference signal resource is referred multiple times by one or more resource settings, the reference signal resource may be counted multiple times. In some other cases, the UE may be configured to jointly report both downlink and uplink, for example, in a same CSI report.

Various aspects of the present disclosure relate to techniques for how the UE is to count the number of reference signal resources for a joint CSI report. The UE may transmit a UE capability report that includes an indication of a maximum number of active reference signal resources within a transmission time interval (TTI) (e.g., one or more slots) supported by the UE for jointly reporting CSI for both downlink and uplink. The reference signal resources may include CSI-RS resources or CSI-RS ports, or both. Alternatively, the reference signal resources may include SSB resources. The UE may count the number of active reference signal resources for a CSI report with joint reporting of downlink and uplink as described herein.

For example, each active reference signal resource (e.g., each CSI-RS resource, each CSI-RS port, or each SSB) of the maximum number of active reference signal resources for the CSI report may be counted as at least one count. In some other examples, each active reference signal resource (e.g., each CSI-RS resource, each CSI-RS port, or each SSB) of the maximum number of active reference signal resources for the CSI report may be counted as at least two counts, for example, one count for downlink and one count for uplink. In other examples, the count for the uplink may be based on an amount of uplink information to be reported in the CSI report, or a set of uplink information to be reported in the CSI report, as described herein.

Particular implementations of the subject matter described in this disclosure can be implemented to realize one or more of the following potential advantages. The techniques employed by the UE may provide benefits and enhancements to the operation of the UE. For example, operations performed by the UE may provide higher reliability wireless communications (for example, downlink reception, uplink transmission) by providing improvements to joint CSI reporting. In some implementations, configuring the UE to provide an indication in the UE capability report may support improvements to channel and interference measurement for both downlink and uplink. Additionally, in other implementations, operations performed by the UE for counting active reference signal resources for both downlink and uplink may promote higher reliability and lower latency wireless communications, among other benefits.

Aspects of the disclosure are initially described in the context of wireless communications systems. Aspects of the disclosure are further illustrated by and described with reference to apparatus diagrams, system diagrams, and flowcharts that relate to counting active reference signals for a joint CSI report.

FIG. 1 illustrates an example of a wireless communications system 100 that supports counting active reference signals for a joint CSI report in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may select a beam measurement and report setting from a list of beam measurement and report settings to facilitate inter-TRP beam pairing. For example, in a CSI report, the UE 115 may report a number of N beam pairs or beam groups, where N is greater than 1 (i.e., N>1). In addition, the UE 115 may report, in the CSI report, a number of M beams per beam pair or per beam group, where M is greater than or equal to 1 (i.e., M≥1). In some cases, M may be equal or different across different beam pairs or beam groups. The UE 115 may concurrently receive different beams in different beam pairs or beam groups. In some other examples, the UE 115 may report, in a CSI report, a number of N beam pairs or beam groups, where N is greater than or equal to 1 (i.e., N≥1). In addition, the UE 115 may report, in the CSI report, a number of M beams per beam pair or per beam group, where M is greater than 1 (i.e., M>1). The UE 115 may thus concurrently receive different beams within a beam pair or a beam group.

A UE 115 may report a number of M beams, where M is greater than or equal to 1 (i.e., M≥1) in a number of N CSI reports corresponding to a number of report settings, where Nis greater than 1 (i.e., N>1). The UE 115 may simultaneously receive different beams according to the different CSI reports. In some cases, the UE 115 may be configured to determine an association between different CSI reports. For example, the UE 115 may be configured to indicate different reported measurements for beams that are received simultaneously (e.g., at the same time) compared to other beams that are not received simultaneously (e.g., at different times). The UE 115 may also be configured to provide an indication with the CSI reports to indicate whether the beams in different CSI reports can be received simultaneously.

In the wireless communications system 100, a UE 115 may be configured to reduce latency for selecting one or more uplink antenna panels to support beamformed communications via directional beams. In some examples, the UE 115 may be configured to select one or more uplink antenna panels with reduced latency to mitigate a maximum permissible exposure (VIPE). In some cases, a UE 115 may be a multi-panel UE (MP-UE). To facilitate fast uplink panel selection and MPE mitigation, uplink transmit antenna panels may be the same set or subset of downlink receive antenna panels. Additionally, to facilitate fast uplink panel selection, the UE 115 may be configured with UE-initiated uplink antenna panel selection and activation. Alternatively, the network (e.g., a base station 105) may be configured to initiate the uplink antenna panel selection and activation for the UE 115. In some other examples, the UE 115 may be configured to select one or more uplink antenna panels with reduced latency for UE power saving. In other examples, the UE 115 may be configured to select one or more uplink antenna panels with reduced latency for uplink interference measurement. Additionally or alternatively, the UE 115 may be configured to select one or more uplink antenna panels with reduced latency for different configurations across different antenna panels or for uplink multiple TRPs (mTRPs).

In the wireless communications system 100, one or more base stations 105 (e.g., one or more transmission and reception points (TRPs)) and a UE 115 may be configured to support beamformed communications via directional beams. For example, the UE 115 may be configured with multiple antenna panels to support the beamformed communications. In some cases, to maintain a reliability of the beamformed communications, the UE 115 may be configured with a report configuration. The UE 115 may be configured to support an active CSI-RS count for multiple CSI reporting. For example, a non-zero power (NZP) CSI-RS resource may be active in a duration of time defined as follows. For aperiodic CSI-RS, the NZP CSI-RS may be active starting from the end of a PDCCH transmission carrying a request and ending at the end of a PUSCH transmission carrying a CSI report associated with this aperiodic CSI-RS. For semi-persistent CSI-RS, the NZP CSI-RS may be active starting from the end of when the activation command is applied, and ending at the end of when the deactivation command is applied. For periodic CSI-RS, the NZP CSI-RS may be active starting when the periodic CSI-RS is configured by higher layer signaling (e.g., RRC signaling), and ending when the periodic CSI-RS configuration is released.

A base station 105 may configure a set of downlink reference signal resources for a UE 115 to use to report downlink information. In some examples, the set of downlink reference signal resources may also be used by the UE 115 to jointly report the downlink information and the uplink information in a same CSI report. The base station 105 may transmit one or more downlink reference signals, such as demodulation reference signals (DMRS), CSI-RS, among other examples, to the UE 115. The UE 115 may measure and determine a downlink reference signal received power (RSRP) or a downlink layer one (e.g., physical layer) signal-to-noise-and-interference ratio (SINR) for a downlink channel (e.g., a physical downlink control channel (PDCCH), a physical downlink shared channel (PDSCH)) based on the one or more downlink reference signals. Additionally or alternatively, the UE 115 may transmit one or more uplink reference signals, such as a sounding reference signal (SRS), to the base station 105. The base station 105, or the UE 115, or both, may measure and determine an uplink RSRP for an uplink channel (e.g., a physical uplink control channel (PUCCH), a physical uplink shared channel (PUSCH)) based on the one or more uplink reference signals. The uplink RSRP may be defined as a difference between a maximum output power ($PC_{max}$) and a pathloss.

Various aspects of the present disclosure relate to techniques for how a UE 115 is to count the number of reference signal resources for a joint CSI report for downlink and uplink. The UE 115 may transmit, to a base station 105, a UE capability report that includes an indication of a maximum number of active reference signal resources within a TTI (e.g., a slot) supported by the UE 115 for jointly reporting CSI for both downlink and uplink. The reference signal resources may include CSI-RS resources or CSI-RS ports, or both. Alternatively, the reference signal resources may include SSB resources. The UE 115 may count the number of active reference signal resources for a CSI report with joint reporting of downlink and uplink. In some examples, if a reference signal resource (e.g., a CSI-RS resource) is referred N times by one or more report settings (e.g., CSI report settings) of joint downlink and uplink, the reference signal resource (e.g., a CSI-RS resource, a CSI-RS port) may be counted as 2×N times. The wireless communications system 100 thus may enhance wireless communications by providing joint CSI reporting for downlink and uplink. By configuring a UE 115 to support counting active reference signals for a joint CSI report, the UE 115 may promote higher reliability and lower latency wireless communications, among other benefits.

Figure 2:
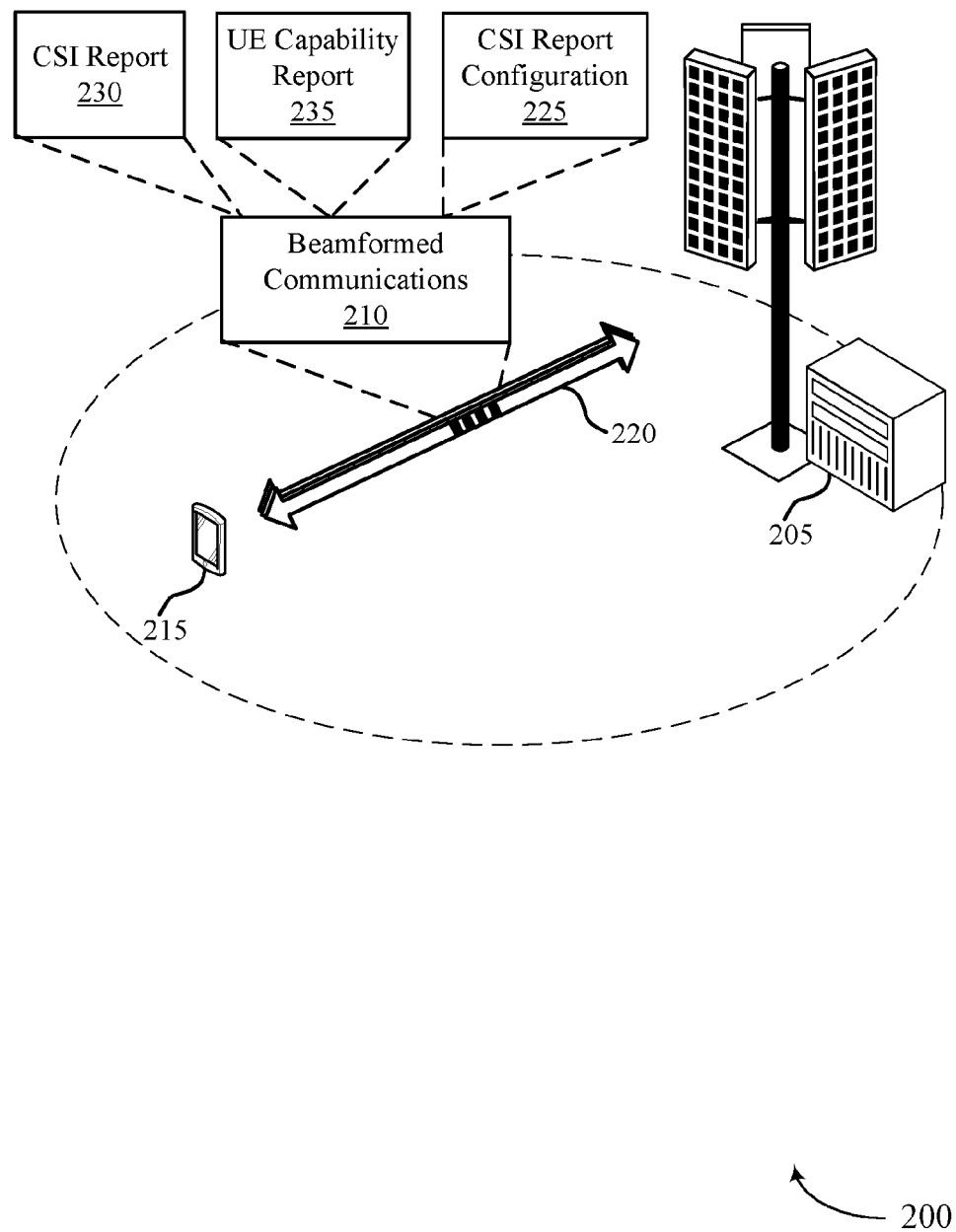

FIG. 2 illustrates an example of a wireless communications system 200 that supports counting active reference signals for a joint CSI report in accordance with aspects of the present disclosure. The wireless communications system 200 may implement aspects of the wireless communications system 100 or may be implemented by aspects of the wireless communications system 100. The wireless communications system 200 may include a base station 205 and a UE 215, which may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency wireless communications, among other benefits.

The base station 205 and the UE 215 may be configured with multiple antennas, which may be used to employ techniques such as transmit diversity, receive diversity, multiple-input multiple-output communications, or beamforming, or any combination thereof. The antennas of the base station 205 and the UE 215 may be located within one or more antenna arrays or antenna panels, which may support multiple-input multiple-output operations or transmit or receive beamforming. For example, the base station 205 antennas or antenna arrays may be co-located at an antenna assembly, such as an antenna tower. In some examples, antennas or antenna arrays associated with the base station 205 may be located in diverse geographic locations.

The base station 205 may have an antenna array with a number of rows and columns of antenna ports that the base station 205 may use to support beamforming of communications with the UE 215. Likewise, the UE 215 may have one or more antenna arrays that may support various multiple-input multiple-output or beamforming operations. Additionally, or alternatively, an antenna panel may support radio frequency beamforming for a signal transmitted via one or more antenna ports. The base station 205 and the UE 215 may thus be configured to support beamformed communications 210 using the multiple antennas and over a communication link 220. Examples of a communication link 220 include a downlink channel or an uplink channel, or a combination thereof. For example, the base station 205 may transmit, and the UE 215 may receive, downlink transmissions on a downlink channel, such as a PDCCH or a PDSCH, or a combination thereof. Likewise, the UE 215 may transmit, and the base station 205 may receive, uplink transmissions on an uplink channel, such as a PUCCH or a PUSCH, or a combination thereof.

In the wireless communications system 200, the UE 215 may perform channel and interference measurements to maintain or improve the beamformed communications 210 with the base station 205. The UE 215 may be configured with a CSI report configuration 225 including various reference signal resource settings (e.g., CSI resource settings) that the UE 215 may select and use to generate a CSI report 230 based on channel and interference measurements performed in accordance with the selected reference signal resource setting. The UE 215 may receive a control message indicating the CSI report configuration 225 corresponding to one or more resources (for example, CSI-RS resources, CSI-RS ports, or SSB resources) over which the UE 215 may monitor for reference signals (e.g. DMRS, CSI-RS, SSB). For example, the UE 215 may receive the control message, such as an RRC message, a MAC-CE message, or a downlink control information (DCI) message, including the CSI report configuration 225 that may link to one or more reference signal resource settings.

The UE 215 may be configured to jointly report CSI for downlink and uplink. For example, the UE 215 may be configured to measure a same reference signal to generate a downlink-related metric, such as layer one reference signal received power (L1-RSRP) or L1 signal-to-interference-plus-noise ratio (L1-SINR). The UE 215 may also be configured to measure a same reference signal to generate an uplink-related metric, such as pathloss estimate. In some examples, the UE 215 may transmit, to the base station 205, a UE capability report 235 that includes an indication of a maximum number of reference signals resources within a TTI (e.g., a slot) supported by the UE 215 for jointly reporting CSI (e.g., the CSI report 230) for both downlink and uplink. In some examples, the UE 215 may report the UE capability per component carrier or across all component carriers. In some other examples, the UE 215 may report the UE capability per radio frequency spectrum band or across all radio frequency spectrum bands.

The base station 205 may transmit to the UE 215, the CSI report configuration 225 based on the UE capability report 235. In some examples, the UE 215 may be configured to count a maximum number of reference signal resources for a joint CSI report (e.g., the CSI report 230). The number of reference signal resources may include the number of CSI-RS resources or the number of CSI-RS ports, or both. In some cases, a CSI-RS resource may have multiple CSI-RS ports. Alternatively, the number of reference signal resources may include a number of SSB resources. The UE 215 may count the number of active reference signal resources for the CSI report 230 with joint reporting of downlink and uplink as follows.

The number of active reference signals resources (e.g., CSI-RS resource, CSI-RS port, or SSB) for a CSI report with joint reporting for downlink and uplink may be counted as at least one count for each active reference signal resource. That is, each active reference signal resource (e.g., each CSI-RS resource, each CSI-RS port, or each SSB) of the maximum number of active reference signal resources for the CSI report may be counted as one. In some other examples, the number of active reference signals resources (e.g., CSI-RS resource, CSI-RS port, or SSB) for a CSI report with joint reporting for downlink and uplink may be counted as at least two counts, one count for downlink related metrics and another count for uplink related metrics. That is, each active reference signal resource (e.g., each CSI-RS resource, each CSI-RS port, or each SSB) of the maximum number of active reference signal resources for the CSI report may be counted as two (e.g., one for downlink and one for uplink).

In some examples, the count for the downlink may be one count while the uplink may be variable and defined by x. That is, the number of reference signal resources for a joint CSI report for downlink and uplink may be 1+x. For example, the number of active reference signals resources (e.g., CSI-RS resource, CSI-RS port) for the CSI report 230 with joint reporting for downlink and uplink may be counted based on a maximum number of uplink information to be reported. For example, the maximum number of uplink information may be two (e.g., x=2) when there is uplink information associated with two antenna panels associated with the UE 215. In some other examples, the number of active reference signals resources (e.g., CSI-RS resource, CSI-RS port, or SSB) for the CSI report 230 with joint reporting for downlink and uplink may be counted based on a maximum uplink information set to be reported. For example, the maximum uplink information set may be three (e.g., x=3) when there is uplink information with different combinations of two antenna panels (e.g., a first antenna panel, a second antenna panel, and both the first antenna panel and the second antenna panel).

The UE 215 may measure CSI for one or more potential signal paths associated with the communication link 220 for both downlink and uplink. For example, the UE 215 may measure a reference signal resources, such as CSI-RS resources or CSI-RS ports, or both, and may use the measurements to perform channel estimation for both downlink and uplink. The CSI-RS transmissions the UE 215 measures may be periodic CSI-RS transmissions, aperiodic CSI-RS transmissions, semi-persistent CSI-RS transmissions, or a combination. Alternatively, the UE 215 may measure an SSB and may use the measurements to perform channel estimation for both downlink and uplink.

The UE 215 may transmit, to the base station 205, the CSI report 230 including the CSI for both the downlink and the uplink. For example, the UE 215 transmit the CSI report 230 to the base station 205 including one or more parameters based on the CSI measurements. The CSI report 230 may include, in some implementations, one or more precoding matrix indicators (PMIs), rank indicators (RIs), layer indicators (LIs), channel quality indicators (CQIs), RSRP measurements (for example, L1-RSRPs), SINR measurements (for example, L1-SINRs), or the like.

In some examples, the UE 215 may perform periodic CSI reporting. For example, the base station 205 may transmit higher layer signaling scheduling periodic CSI reports. In some other examples, the UE 215 may perform aperiodic CSI reporting. For example, the base station 205 may dynamically configure a CSI report. In other examples, the UE 215 may perform semi-persistent CSI reporting. For example, the base station 205 may transmit higher layer signaling scheduling periodic CSI reports and may use dynamic signaling to trigger the periodic CSI reporting, or a combination.

The wireless communications system 200 thus may enhance wireless communications by providing joint CSI reporting for downlink and uplink. By configuring the UE 215 to support counting active reference signals for a joint CSI report, the UE 215 may promote higher reliability and lower latency wireless communications, among other benefits.

Figure 3:
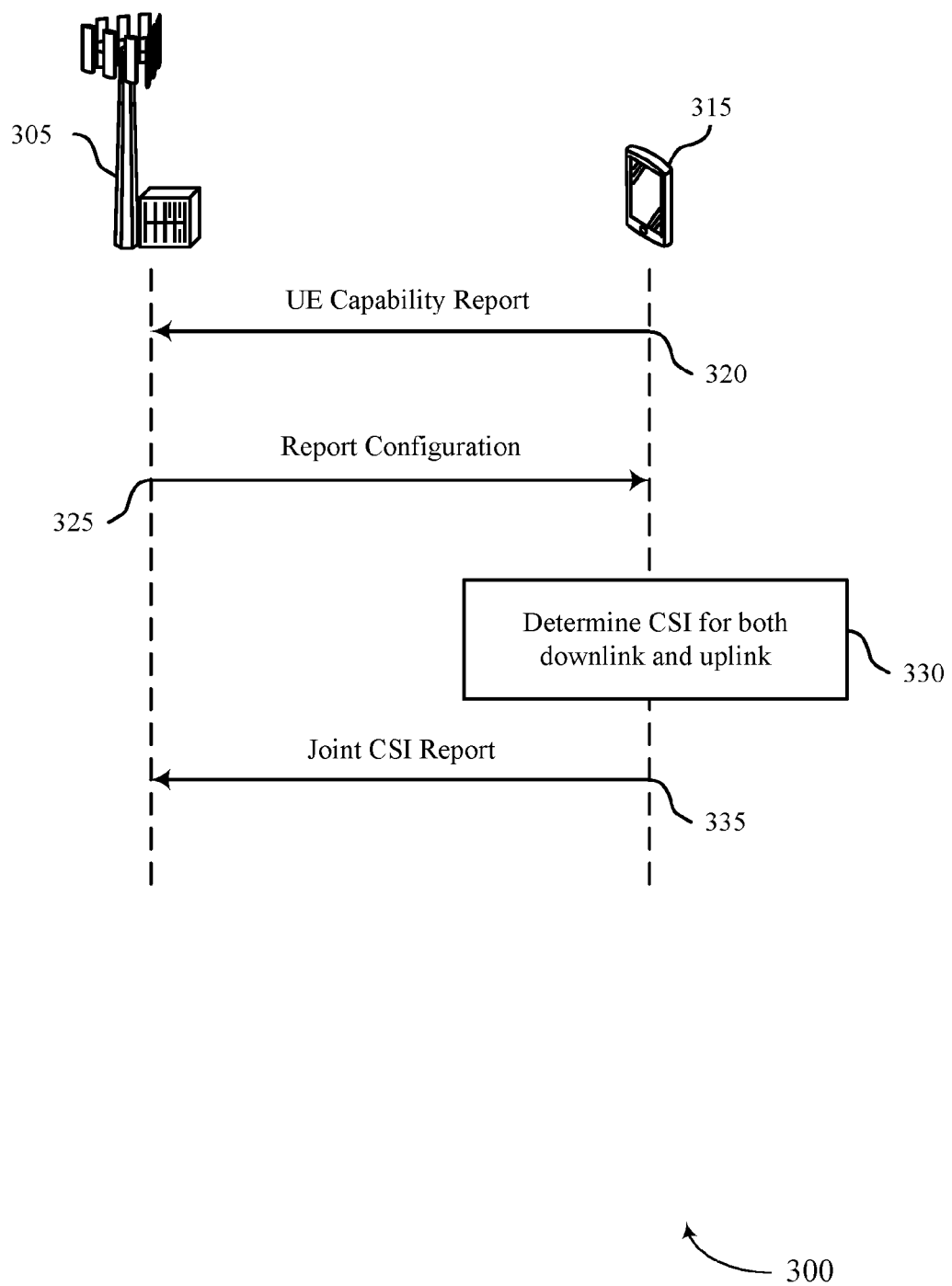
FIG. 3 illustrates an example of a process flow that supports counting active reference signals for a joint CSI report in accordance with aspects of the present disclosure.

FIG. 3 illustrates an example of a process flow 300 that supports counting active reference signals for a joint CSI report in accordance with aspects of the present disclosure. The process flow 300 may implement aspects of the wireless communications systems 100 and 200 or may be implemented by aspects of the wireless communications system 100 and 200 as described with reference to FIGS. 1 and 2, respectively. For example, the process flow 300 may be based on a configuration by a base station 305, which may be implemented by a UE 315. The base station 305 and the UE 315 may be examples of a base station and a UE, as described with reference to FIGS. 1 and 2. In the following description of the process flow 300, the operations between the base station 305 and the UE 315 may be transmitted in a different order than the example order shown, or the operations performed by the base station 305 and the UE 315 may be performed in different orders or at different times. Some operations may also be omitted from the process flow 300, and other operations may be added to the process flow 300.

At 320, the UE 315 may transmit, to the base station 305, a UE capability report. The UE capability report may include an indication (e.g., in an information element (IE) field of the UE capability report) of a maximum number of reference signal resources within a TTI for which the UE 315 supports CSI reporting. The maximum number of reference signal resources may be based on a UE 315 capability for supporting joint CSI reporting for both a downlink and an uplink. In some examples, the maximum number of reference signal resources includes CSI-RS resources, or CSI-RS ports, or both, for the downlink and the uplink. In some other examples, the maximum number of reference signal resources includes SSB resources for the downlink and the uplink. At 325, the base station 305 may transmit, to the UE 315, a report configuration in response to the UE capability report. At 330, the UE 315 may determine CSI for both downlink and uplink. For example, the UE 315 may determine CSI for both downlink and uplink based on one or more reference signals, such as CSI-RS, SRS, DMRS, etc. At 335, the UE 315 may transmit a joint CSI report including the CSI for both the downlink and the uplink.

The process flow 300 may implement or be implemented to cover how the UE 315 is to count the number of reference signal resources for a joint CSI report for downlink and uplink. For example, the UE 315 may assign at least one count for each reference signal resource of the maximum number of reference signal resources associated with joint CSI reporting for both the downlink and the uplink. In other examples, the UE 315 may assign at least two counts for each active reference signal resource of maximum number of reference signal resources associated with joint CSI reporting for both the downlink and the uplink. For example, a first count of the at least two counts corresponds to the downlink and a second count of the at least two counts corresponds to the uplink.

In some examples, the count for the downlink may be one count while the uplink may be variable and defined by x. That is, the number of reference signal resources for a joint CSI report for downlink and uplink may be 1+x. In some examples, the second count (e.g., x) may be based on a maximum number of uplink information (e.g., an amount of uplink information) to be reported in the CSI report by the UE 315. The maximum number of uplink information to be reported in the CSI report corresponds to a number of antenna panels. As such, the UE 315 may assign at least one count for each antenna panel of the number of antenna panels corresponding to an uplink information of the maximum number of uplink information. The UE 315 may then determine a total count based on the assigning of the at least one count for each antenna panel of the number of antenna panels. Here, the second count includes the total count.

Alternatively, the second count (e.g., x) may be based on a set of uplink information to be reported in the CSI report. The set of uplink information to be reported in the CSI report corresponds to one or more antenna panels of a set of antenna panels. As such, the UE 315 may assign at least one count for each antenna panel or a combination of antenna panels of the set of antenna panels based on the set of uplink information to be reported in the CSI report. The UE 315 may then determine a total count based on the assigning of the at least one count for each antenna panel or the combination of antenna panels of the set of antenna panels. Here, the second count includes the total count.

Figure 4:
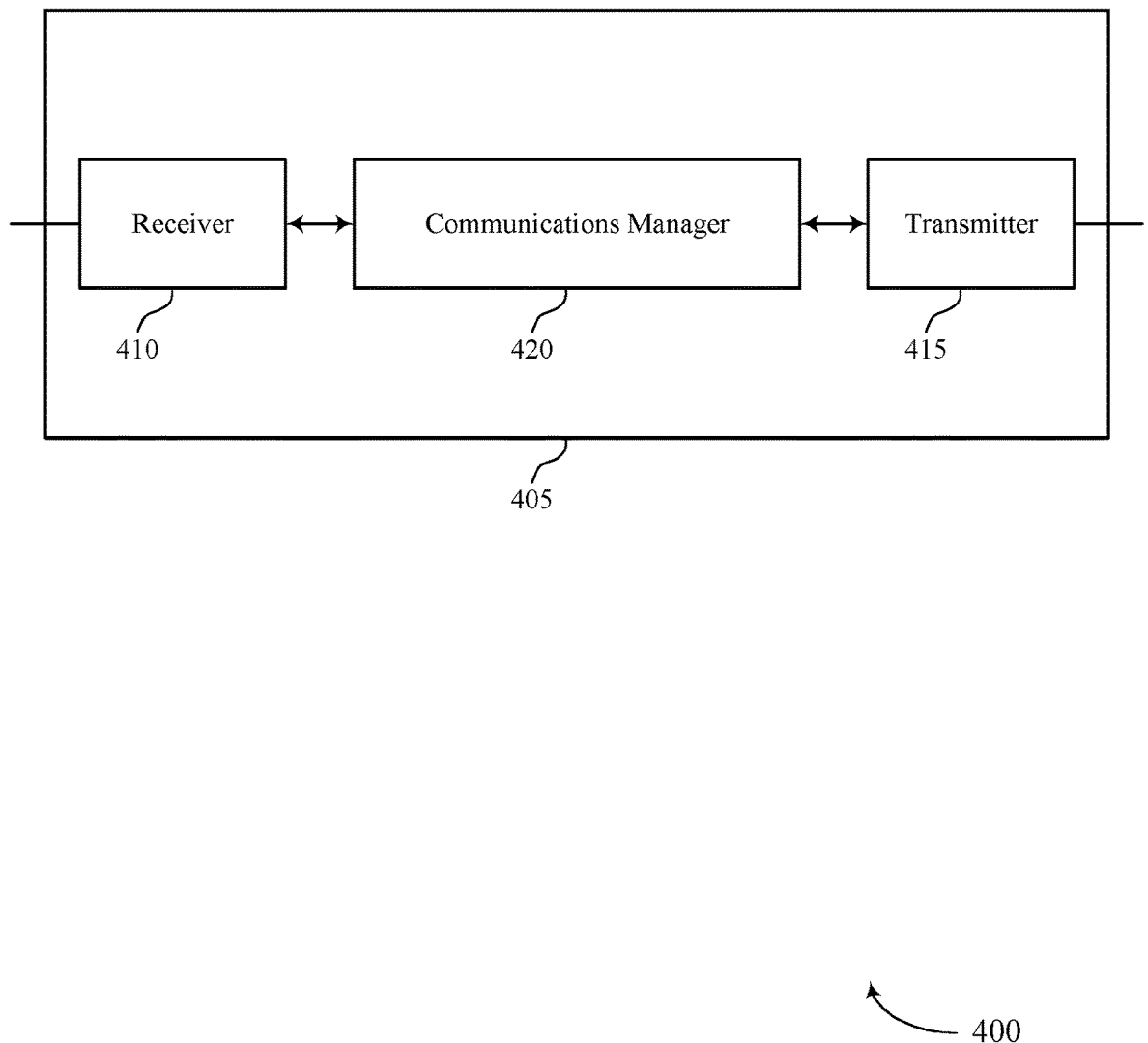
FIGS. 4 and 5 show block diagrams of devices that support counting active reference signals for a joint CSI report in accordance with aspects of the present disclosure.

FIG. 4 shows a block diagram 400 of a device 405 that supports counting active reference signals for a joint CSI report in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to counting active reference signals for a joint CSI report). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to counting active reference signals for a joint CSI report). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of counting active reference signals for a joint CSI report as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at the device 405 (e.g., a UE) in accordance with examples as disclosed herein. For example, the communications manager 420 may be configured as or otherwise support a means for transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The communications manager 420 may be configured as or otherwise support a means for receiving, from the base station, a report configuration in response to the UE capability report. The communications manager 420 may be configured as or otherwise support a means for determining CSI for both the downlink and the uplink based on receiving one or more reference signals. The communications manager 420 may be configured as or otherwise support a means for transmitting, to the base station, a CSI report including the CSI (also referred to as CSI information) for both the downlink and the uplink, in accordance with the report configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques reduced power consumption, and more efficient utilization of communication resources.

Figure 5:
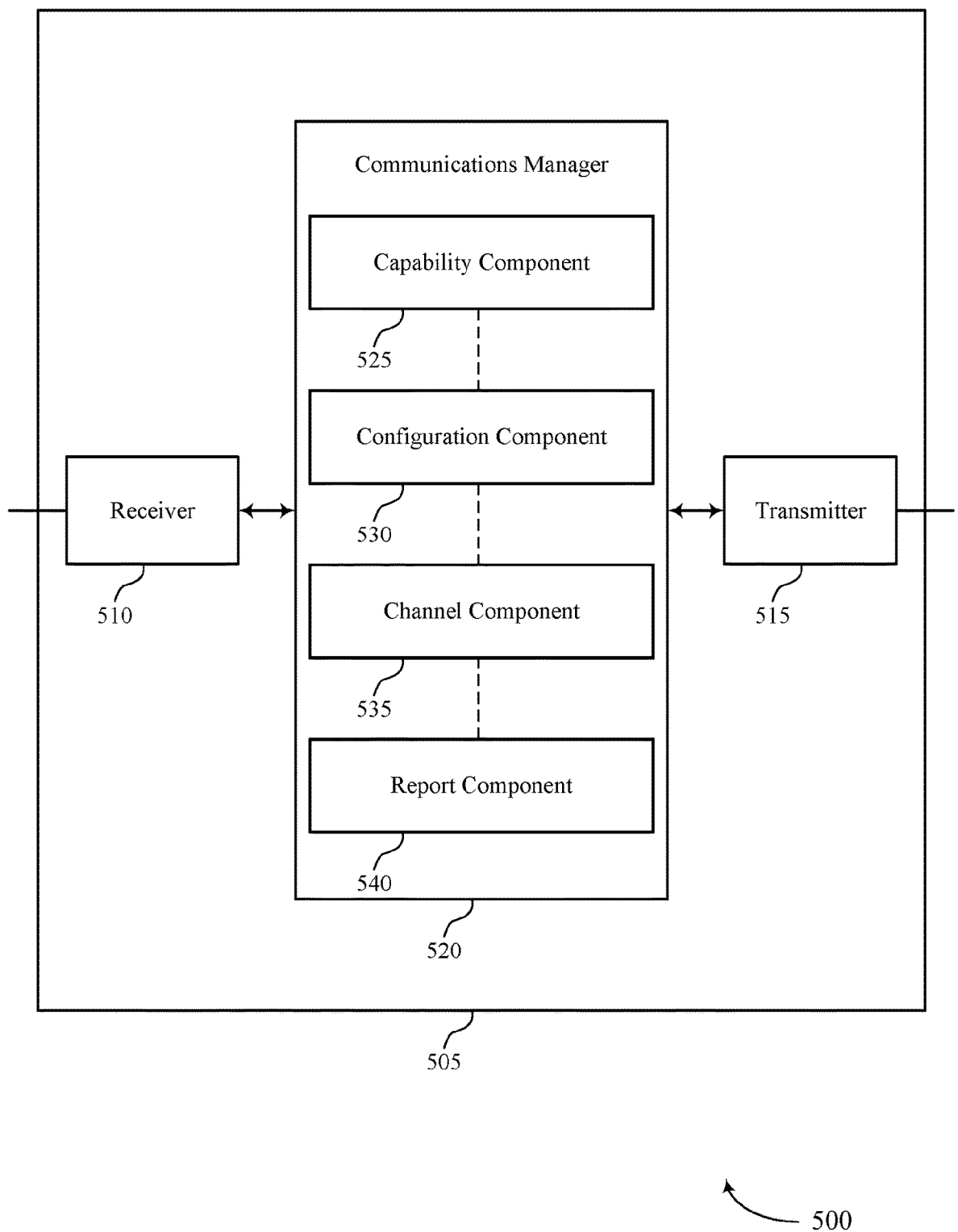

FIG. 5 shows a block diagram 500 of a device 505 that supports counting active reference signals for a joint CSI report in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to counting active reference signals for a joint CSI report). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to counting active reference signals for a joint CSI report). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of counting active reference signals for a joint CSI report as described herein. For example, the communications manager 520 may include a capability component 525, a configuration component 530, a channel component 535, a report component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 (e.g., a UE) in accordance with examples as disclosed herein. The capability component 525 may be configured as or otherwise support a means for transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The configuration component 530 may be configured as or otherwise support a means for receiving, from the base station, a report configuration in response to the UE capability report. The channel component 535 may be configured as or otherwise support a means for determining CSI for both the downlink and the uplink based on receiving one or more reference signals. The report component 540 may be configured as or otherwise support a means for transmitting, to the base station, a CSI report including the CSI for both the downlink and the uplink, in accordance with the report configuration.

Figure 6:
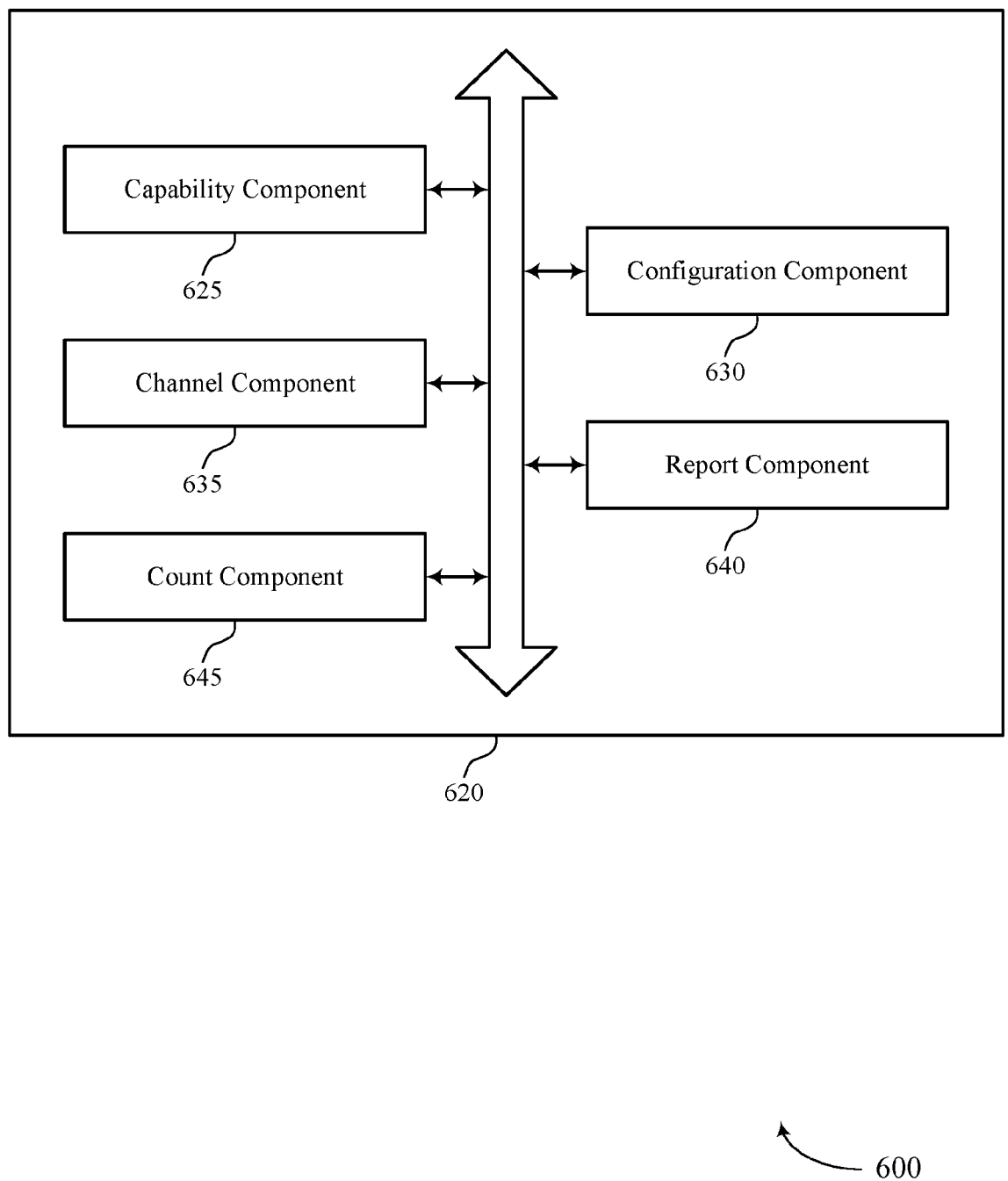
FIG. 6 shows a block diagram of a communications manager that supports counting active reference signals for a joint CSI report in accordance with aspects of the present disclosure.

FIG. 6 shows a block diagram 600 of a communications manager 620 that supports counting active reference signals for a joint CSI report in accordance with aspects of the present disclosure. The communications manager 620 may be an example of aspects of a communications manager 420, a communications manager 520, or both, as described herein. The communications manager 620, or various components thereof, may be an example of means for performing various aspects of counting active reference signals for a joint CSI report as described herein. For example, the communications manager 620 may include a capability component 625, a configuration component 630, a channel component 635, a report component 640, a count component 645, or any combination thereof. Each of these components may communicate, directly or indirectly, with one another (e.g., via one or more buses).

The communications manager 620 may support wireless communication at a UE in accordance with examples as disclosed herein. The capability component 625 may be configured as or otherwise support a means for transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The configuration component 630 may be configured as or otherwise support a means for receiving, from the base station, a report configuration in response to the UE capability report. The channel component 635 may be configured as or otherwise support a means for determining CSI for both the downlink and the uplink based on receiving one or more reference signals. The report component 640 may be configured as or otherwise support a means for transmitting, to the base station, a CSI report including the CSI for both the downlink and the uplink, in accordance with the report configuration.

The count component 645 may be configured as or otherwise support a means for assigning at least one count for each reference signal resource of the report configuration associated with the joint CSI reporting for both the downlink and the uplink. In some examples, the count component 645 may be configured as or otherwise support a means for assigning at least two counts for each reference signal resource of the report configuration associated with the joint CSI reporting for both the downlink and the uplink. In some examples, a first count of the at least two counts corresponds to the downlink and a second count of the at least two counts corresponds to the uplink.

In some examples, the second count is based on an amount of uplink information to be reported in the CSI report. The amount of uplink information to be reported in the CSI report corresponds to a number of antenna panels, and the count component 645 may be configured as or otherwise support a means for assigning at least one count for each antenna panel of the number of antenna panels based at least in part on the amount of uplink information. In some examples, the amount of uplink information to be reported in the CSI report corresponds to a number of antenna panels, and the count component 645 may be configured as or otherwise support a means for determining a total count based on the assigning of the at least one count for each antenna panel of the number of antenna panels, where the second count includes the total count.

In some examples, the second count is based on a set of uplink information to be reported in the CSI report. The set of uplink information to be reported in the CSI report corresponds to one or more antenna panels of a set of antenna panels, and the count component 645 may be configured as or otherwise support a means for assigning at least one count for each antenna panel or a combination of antenna panels of the set of antenna panels based on the set of uplink information to be reported in the CSI report. In some examples, the set of uplink information to be reported in the CSI report corresponds to one or more antenna panels of a set of antenna panels, and the count component 645 may be configured as or otherwise support a means for determining a total count based on the assigning of the at least one count for each antenna panel or the combination of antenna panels of the set of antenna panels, where the second count includes the total count.

The maximum number of reference signal resources includes CSI-RS resources, reference signal ports (e.g., CSI-RS ports, DMRS ports, SRS ports, etc.), or both, for the downlink and the uplink. In some examples, the maximum number of reference signal resources includes SSB resources for the downlink and the uplink. In some examples, the maximum number of reference signal resources supported by the UE is for joint CSI reporting for both the downlink and the uplink on a per component carrier basis or on a per radio frequency spectrum band basis. In some examples, the maximum number of reference signal resources supported by the UE is for joint CSI reporting for both the downlink and the uplink across a set of component carriers or across a set of radio frequency spectrum bands.

Figure 7:
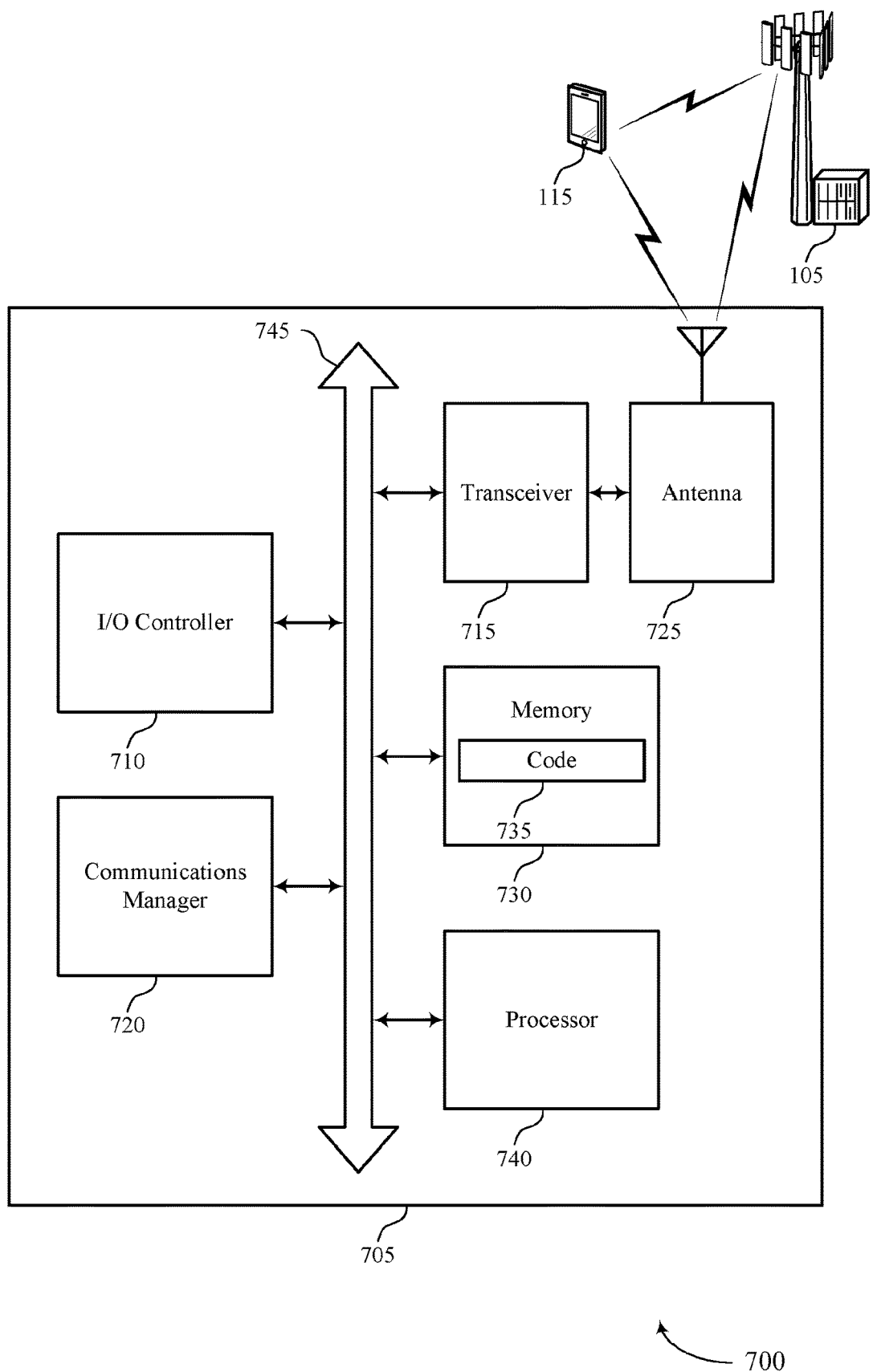
FIG. 7 shows a diagram of a system including a device that supports counting active reference signals for a joint CSI report in accordance with aspects of the present disclosure.

FIG. 7 shows a diagram of a system 700 including a device 705 that supports counting active reference signals for a joint CSI report in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting counting active reference signals for a joint CSI report). For example, the device 705 or a component of the device 705 may include a processor 740 and memory 730 coupled to the processor 740, the processor 740 and memory 730 configured to perform various functions described herein.

The communications manager 720 may support wireless communication at the device 705 (e.g., a UE) in accordance with examples as disclosed herein. For example, the communications manager 720 may be configured as or otherwise support a means for transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The communications manager 720 may be configured as or otherwise support a means for receiving, from the base station, a report configuration in response to the UE capability report. The communications manager 720 may be configured as or otherwise support a means for determining CSI for both the downlink and the uplink based on receiving one or more reference signals. The communications manager 720 may be configured as or otherwise support a means for transmitting, to the base station, a CSI report including the CSI for both the downlink and the uplink, in accordance with the report configuration.

By including or configuring the communications manager 720 in accordance with examples as described herein, the device 705 may support techniques for improved communication reliability, reduced latency, reduced power consumption, more efficient utilization of communication resources, longer battery life, among other examples.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of counting active reference signals for a joint CSI report as described herein, or the processor 740 and the memory 730 may be otherwise configured to perform or support such operations.

Figure 8:
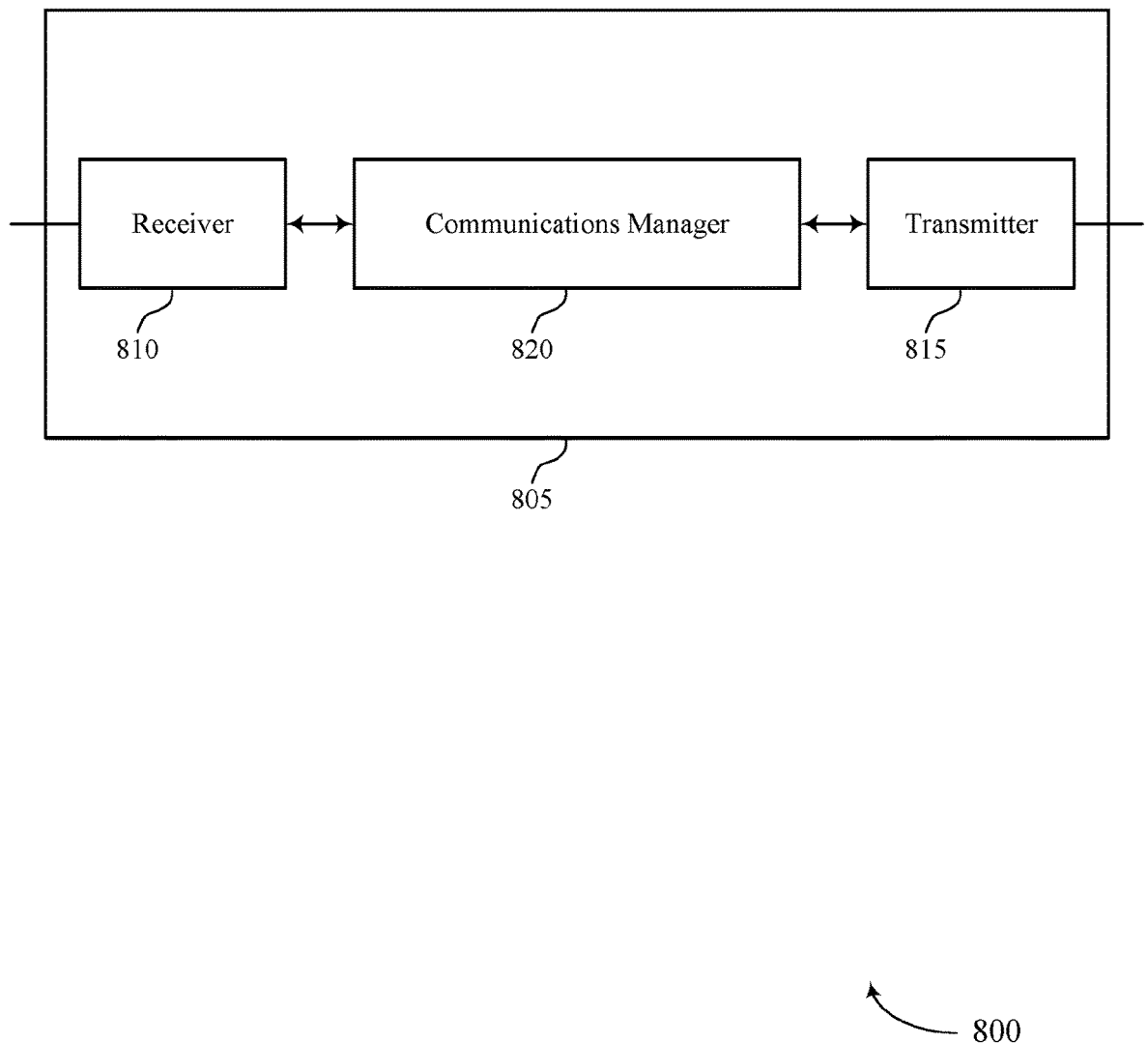
FIGS. 8 and 9 show block diagrams of devices that support counting active reference signals for a joint CSI report in accordance with aspects of the present disclosure.

FIG. 8 shows a block diagram 800 of a device 805 that supports counting active reference signals for a joint CSI report in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to counting active reference signals for a joint CSI report). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to counting active reference signals for a joint CSI report). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of counting active reference signals for a joint CSI report as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 (e.g., a base station) in accordance with examples as disclosed herein. For example, the communications manager 820 may be configured as or otherwise support a means for receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The communications manager 820 may be configured as or otherwise support a means for transmitting, to the UE, a report configuration based on the UE capability report. The communications manager 820 may be configured as or otherwise support a means for receiving, from the UE, a CSI report including the CSI for both the downlink and the uplink, in accordance with the report configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption and more efficient utilization of communication resources.

Figure 9:
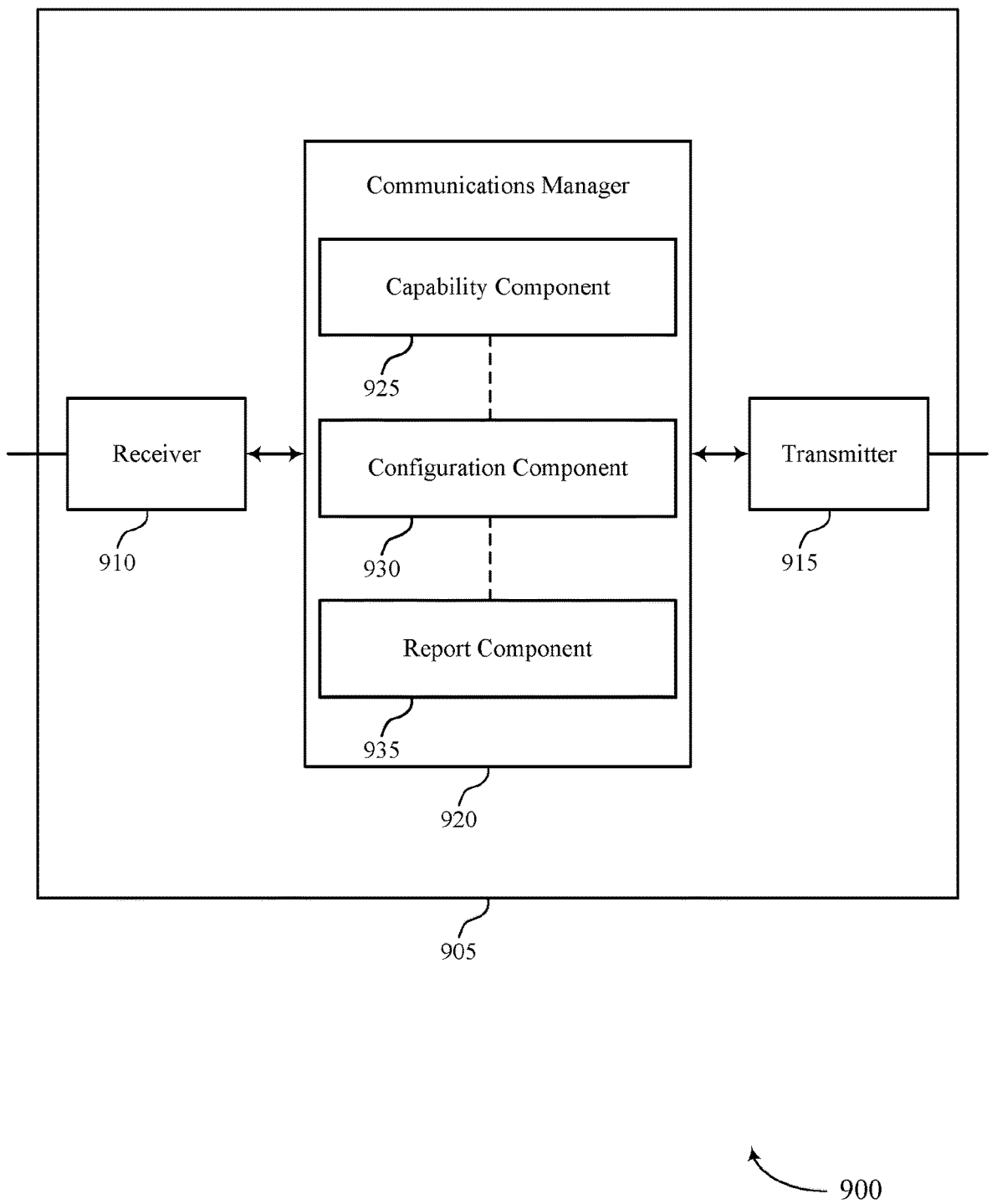

FIG. 9 shows a block diagram 900 of a device 905 that supports counting active reference signals for a joint CSI report in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to counting active reference signals for a joint CSI report). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to counting active reference signals for a joint CSI report). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of counting active reference signals for a joint CSI report as described herein. For example, the communications manager 920 may include a capability component 925, a configuration component 930, a report component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a base station) in accordance with examples as disclosed herein. The capability component 925 may be configured as or otherwise support a means for receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The configuration component 930 may be configured as or otherwise support a means for transmitting, to the UE, a report configuration based on the UE capability report. The report component 935 may be configured as or otherwise support a means for receiving, from the UE, a CSI report including the CSI for both the downlink and the uplink, in accordance with the report configuration.

Figure 10:
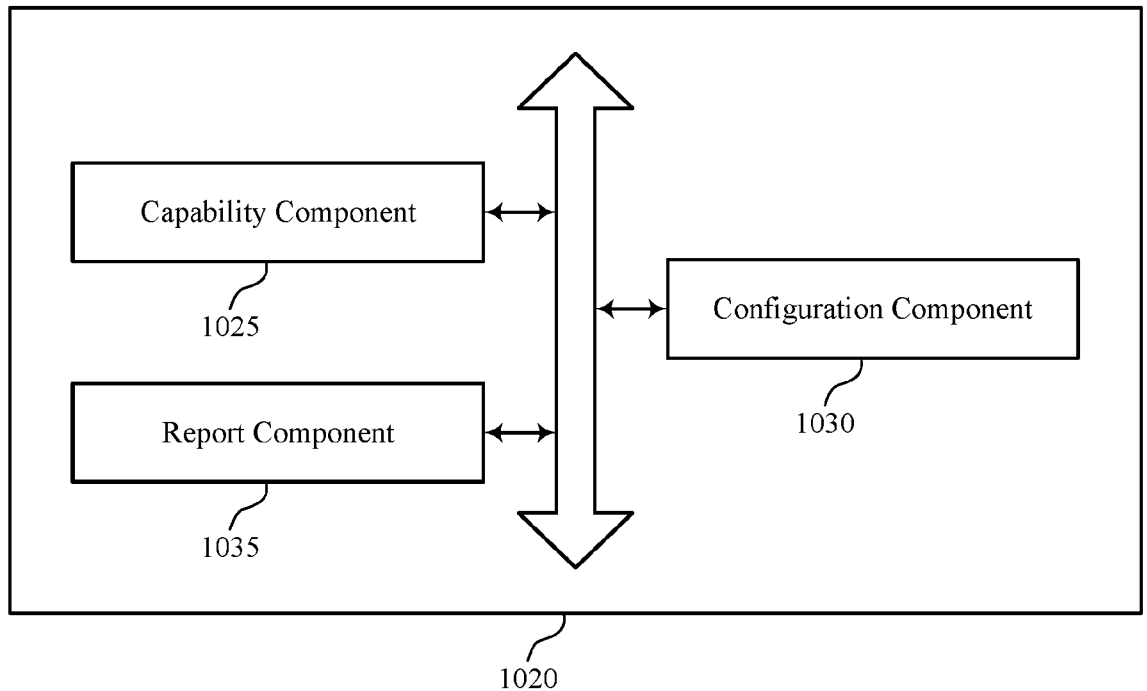
FIG. 10 shows a block diagram of a communications manager that supports counting active reference signals for a joint CSI report in accordance with aspects of the present disclosure.

FIG. 10 shows a block diagram 1000 of a communications manager 1020 that supports counting active reference signals for a joint CSI report in accordance with aspects of the present disclosure. The communications manager 1020 may be an example of aspects of a communications manager 820, a communications manager 920, or both, as described herein. The communications manager 1020, or various components thereof, may be an example of means for performing various aspects of counting active reference signals for a joint CSI report as described herein. For example, the communications manager 1020 may include a capability component 1025, a configuration component 1030, a report component 1035, or any combination thereof. Each of these components may communicate, directly or indirectly, with one another (e.g., via one or more buses).

The communications manager 1020 may support wireless communication at a base station in accordance with examples as disclosed herein. The capability component 1025 may be configured as or otherwise support a means for receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The configuration component 1030 may be configured as or otherwise support a means for transmitting, to the UE, a report configuration based on the UE capability report. The report component 1035 may be configured as or otherwise support a means for receiving, from the UE, a CSI report including the CSI for both the downlink and the uplink, in accordance with the report configuration.

In some examples, the maximum number of reference signal resources includes CSI-RS resources, reference signal ports (e.g., CSI-RS ports), or both, for the downlink and the uplink. In some examples, the maximum number of reference signal resources includes SSB resources for the downlink and the uplink. In some examples, the maximum number of reference signal resources supported by the UE is for joint CSI reporting for both the downlink and the uplink on a per component carrier basis or on a per radio frequency spectrum band basis. In some examples, the maximum number of reference signal resources supported by the UE is for joint CSI reporting for both the downlink and the uplink across a set of component carriers or across a set of radio frequency spectrum bands.

Figure 11:
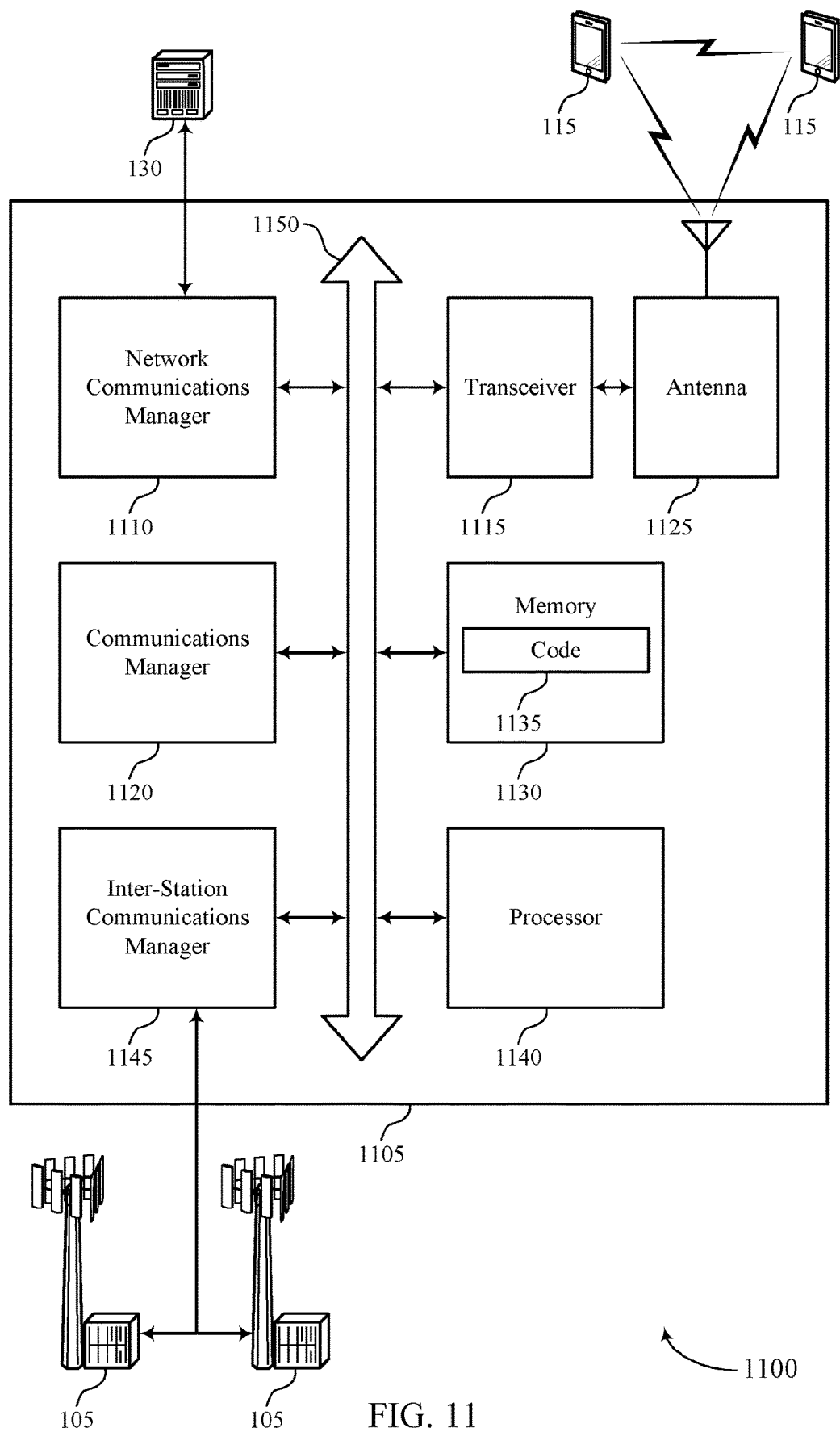
FIG. 11 shows a diagram of a system including a device that supports counting active reference signals for a joint CSI report in accordance with aspects of the present disclosure.

FIG. 11 shows a diagram of a system 1100 including a device 1105 that supports counting active reference signals for a joint CSI report in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting counting active reference signals for a joint CSI report). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at the device 1105 (e.g., a base station) in accordance with examples as disclosed herein. For example, the communications manager 1120 may be configured as or otherwise support a means for receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The communications manager 1120 may be configured as or otherwise support a means for transmitting, to the UE, a report configuration based on the UE capability report. The communications manager 1120 may be configured as or otherwise support a means for receiving, from the UE, a CSI report including the CSI for both the downlink and the uplink, in accordance with the report configuration.

By including or configuring the communications manager 1120 in accordance with examples as described herein, the device 1105 may support techniques for improved communication reliability, reduced latency, reduced power consumption, more efficient utilization of communication resources, improved coordination between devices, longer battery life, among other examples.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of counting active reference signals for a joint CSI report as described herein, or the processor 1140 and the memory 1130 may be otherwise configured to perform or support such operations.

Figure 12:
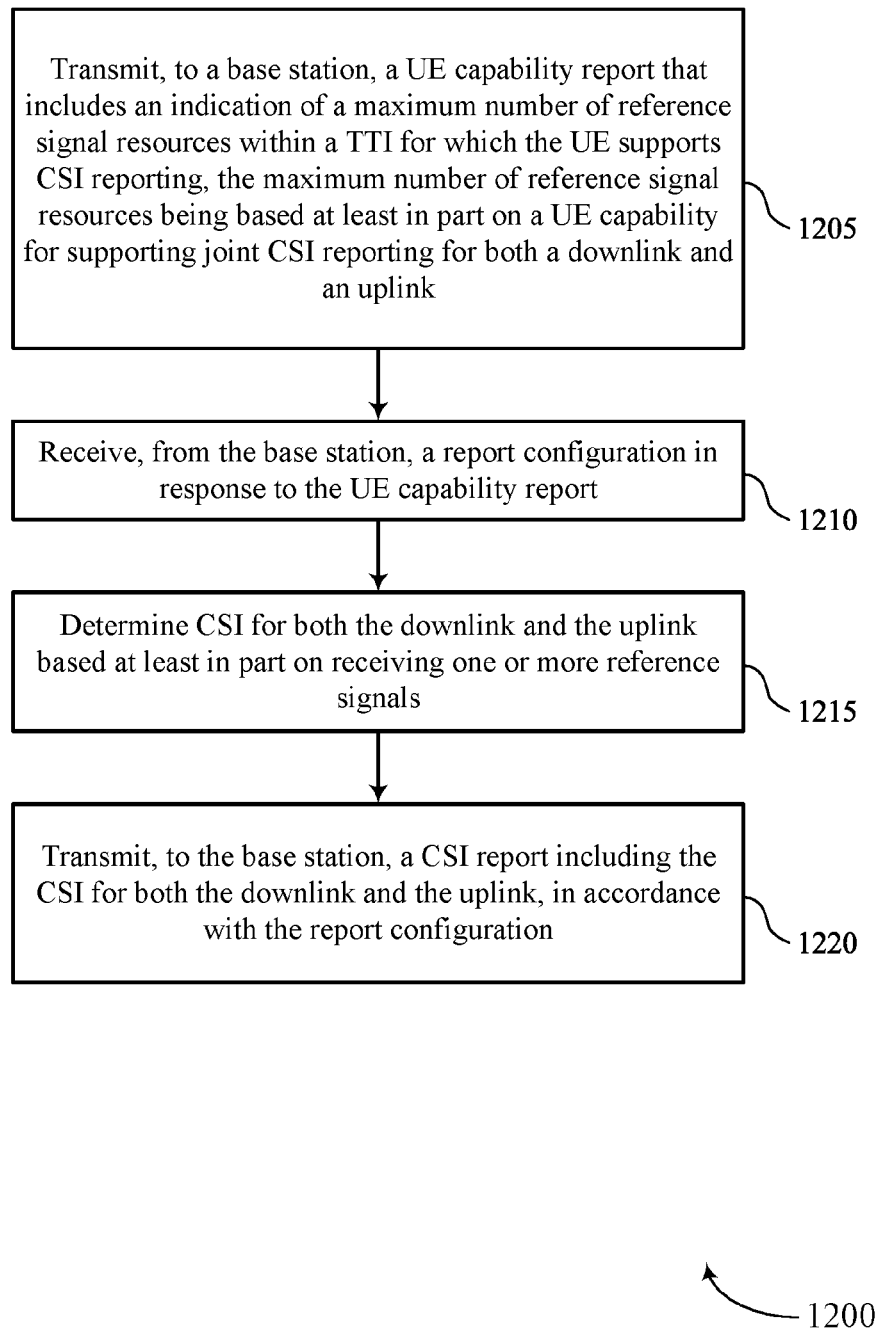
FIGS. 12 through 17 show flowcharts illustrating methods that support counting active reference signals for a joint CSI report in accordance with aspects of the present disclosure.

FIG. 12 shows a flowchart illustrating a method 1200 that supports counting active reference signals for a joint CSI report in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The operations of 1205 may be performed in accordance with examples as disclosed herein. In some examples, aspects of the operations of 1205 may be performed by a capability component 625 as described with reference to FIG. 6.

At 1210, the method may include receiving, from the base station, a report configuration in response to the UE capability report. The operations of 1210 may be performed in accordance with examples as disclosed herein. In some examples, aspects of the operations of 1210 may be performed by a configuration component 630 as described with reference to FIG. 6.

At 1215, the method may include determining CSI for both the downlink and the uplink based on receiving one or more reference signals. The operations of 1215 may be performed in accordance with examples as disclosed herein. In some examples, aspects of the operations of 1215 may be performed by a channel component 635 as described with reference to FIG. 6.

At 1220, the method may include transmitting, to the base station, a CSI report including the CSI for both the downlink and the uplink, in accordance with the report configuration. The operations of 1220 may be performed in accordance with examples as disclosed herein. In some examples, aspects of the operations of 1220 may be performed by a report component 640 as described with reference to FIG. 6.

Figure 13:
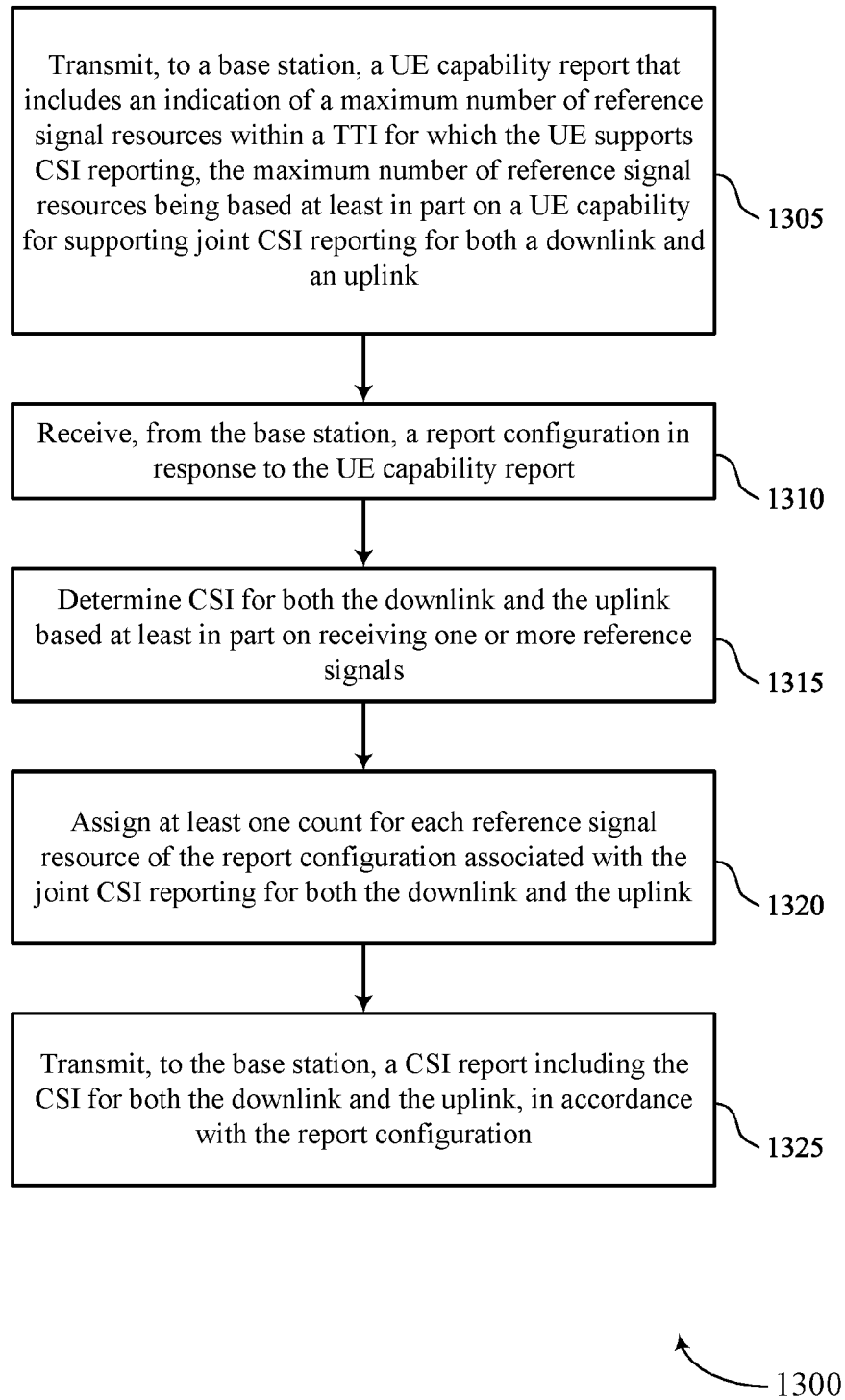

FIG. 13 shows a flowchart illustrating a method 1300 that supports counting active reference signals for a joint CSI report in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The operations of 1305 may be performed in accordance with examples as disclosed herein. In some examples, aspects of the operations of 1305 may be performed by a capability component 625 as described with reference to FIG. 6.

At 1310, the method may include receiving, from the base station, a report configuration in response to the UE capability report. The operations of 1310 may be performed in accordance with examples as disclosed herein. In some examples, aspects of the operations of 1310 may be performed by a configuration component 630 as described with reference to FIG. 6.

At 1315, the method may include determining CSI for both the downlink and the uplink based on receiving one or more reference signals. The operations of 1315 may be performed in accordance with examples as disclosed herein. In some examples, aspects of the operations of 1315 may be performed by a channel component 635 as described with reference to FIG. 6.

At 1320, the method may include assigning at least one count for each reference signal resource of the report configuration associated with the joint CSI reporting for both the downlink and the uplink. The operations of 1320 may be performed in accordance with examples as disclosed herein. In some examples, aspects of the operations of 1320 may be performed by a count component 645 as described with reference to FIG. 6.

At 1325, the method may include transmitting, to the base station, a CSI report including the CSI for both the downlink and the uplink, in accordance with the report configuration. The operations of 1325 may be performed in accordance with examples as disclosed herein. In some examples, aspects of the operations of 1325 may be performed by a report component 640 as described with reference to FIG. 6.

Figure 14:
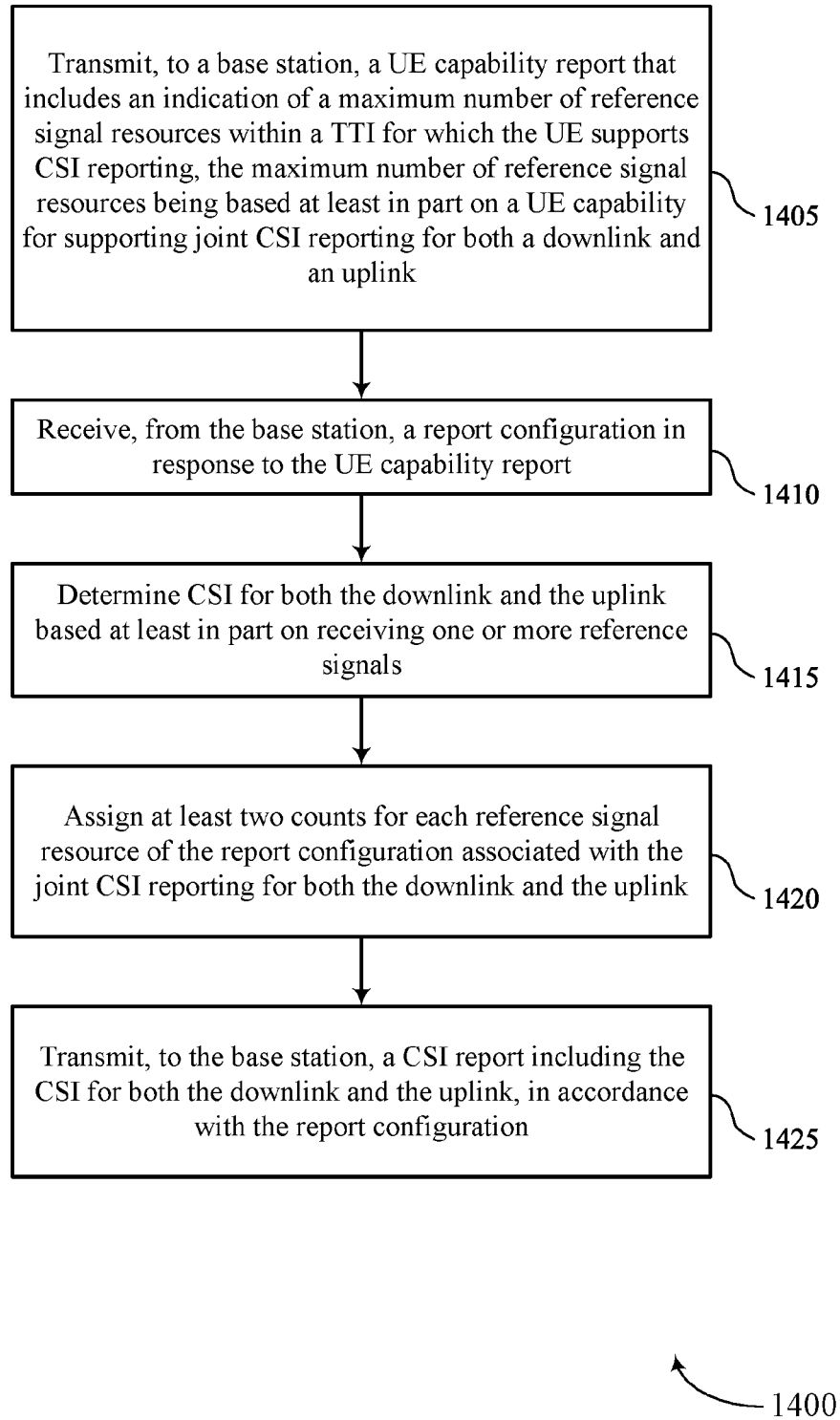

FIG. 14 shows a flowchart illustrating a method 1400 that supports counting active reference signals for a joint CSI report in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The operations of 1405 may be performed in accordance with examples as disclosed herein. In some examples, aspects of the operations of 1405 may be performed by a capability component 625 as described with reference to FIG. 6.

At 1410, the method may include receiving, from the base station, a report configuration in response to the UE capability report. The operations of 1410 may be performed in accordance with examples as disclosed herein. In some examples, aspects of the operations of 1410 may be performed by a configuration component 630 as described with reference to FIG. 6.

At 1415, the method may include determining CSI for both the downlink and the uplink based on receiving one or more reference signals. The operations of 1415 may be performed in accordance with examples as disclosed herein. In some examples, aspects of the operations of 1415 may be performed by a channel component 635 as described with reference to FIG. 6.

At 1420, the method may include assigning at least two counts for each reference signal resource of the report configuration associated with the joint CSI reporting for both the downlink and the uplink. In some examples, a first count of the at least two counts corresponds to the downlink and a second count of the at least two counts corresponds to the uplink. The operations of 1420 may be performed in accordance with examples as disclosed herein. In some examples, aspects of the operations of 1420 may be performed by a count component 645 as described with reference to FIG. 6.

At 1425, the method may include transmitting, to the base station, a CSI report including the CSI for both the downlink and the uplink, in accordance with the report configuration. The operations of 1425 may be performed in accordance with examples as disclosed herein. In some examples, aspects of the operations of 1425 may be performed by a report component 640 as described with reference to FIG. 6.

Figure 15:
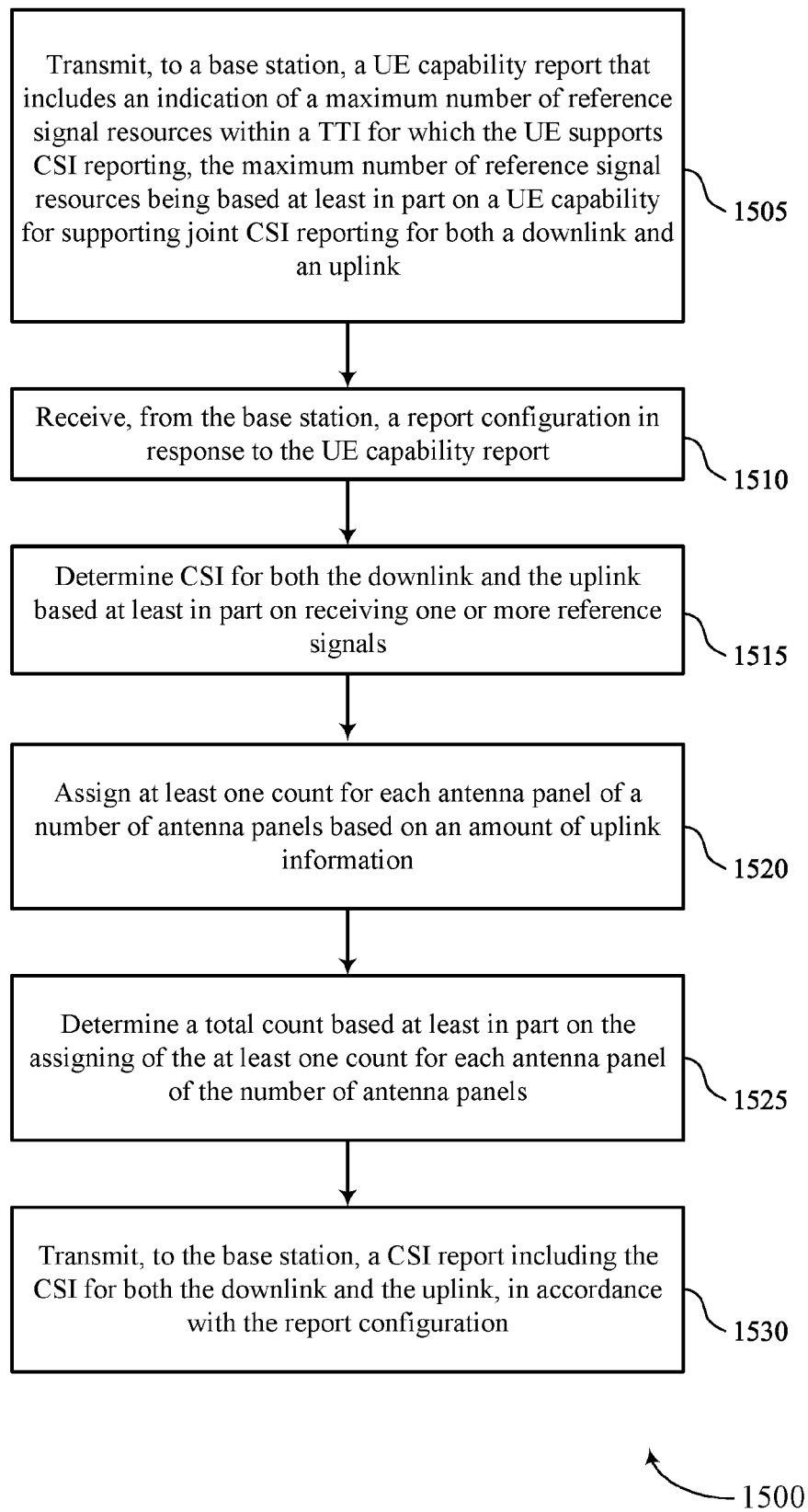

FIG. 15 shows a flowchart illustrating a method 1500 that supports counting active reference signals for a joint CSI report in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. In some examples, an amount of uplink information to be reported in the CSI report corresponds to a number of antenna panels. The operations of 1505 may be performed in accordance with examples as disclosed herein. In some examples, aspects of the operations of 1505 may be performed by a capability component 625 as described with reference to FIG. 6.

At 1510, the method may include receiving, from the base station, a report configuration in response to the UE capability report. The operations of 1510 may be performed in accordance with examples as disclosed herein. In some examples, aspects of the operations of 1510 may be performed by a configuration component 630 as described with reference to FIG. 6.

At 1515, the method may include determining CSI for both the downlink and the uplink based on receiving one or more reference signals. The operations of 1515 may be performed in accordance with examples as disclosed herein. In some examples, aspects of the operations of 1515 may be performed by a channel component 635 as described with reference to FIG. 6.

At 1520, the method may include assigning at least one count for each antenna panel of a number of antenna panels based at least in part on the amount of uplink information. The operations of 1520 may be performed in accordance with examples as disclosed herein. In some examples, aspects of the operations of 1520 may be performed by a count component 645 as described with reference to FIG. 6.

At 1525, the method may include determining a total count based on the assigning of the at least one count for each antenna panel of the number of antenna panels. The operations of 1525 may be performed in accordance with examples as disclosed herein. In some examples, aspects of the operations of 1525 may be performed by a count component 645 as described with reference to FIG. 6.

At 1530, the method may include transmitting, to the base station, a CSI report including the CSI for both the downlink and the uplink, in accordance with the report configuration. The operations of 1530 may be performed in accordance with examples as disclosed herein. In some examples, aspects of the operations of 1530 may be performed by a report component 640 as described with reference to FIG. 6.

Figure 16:
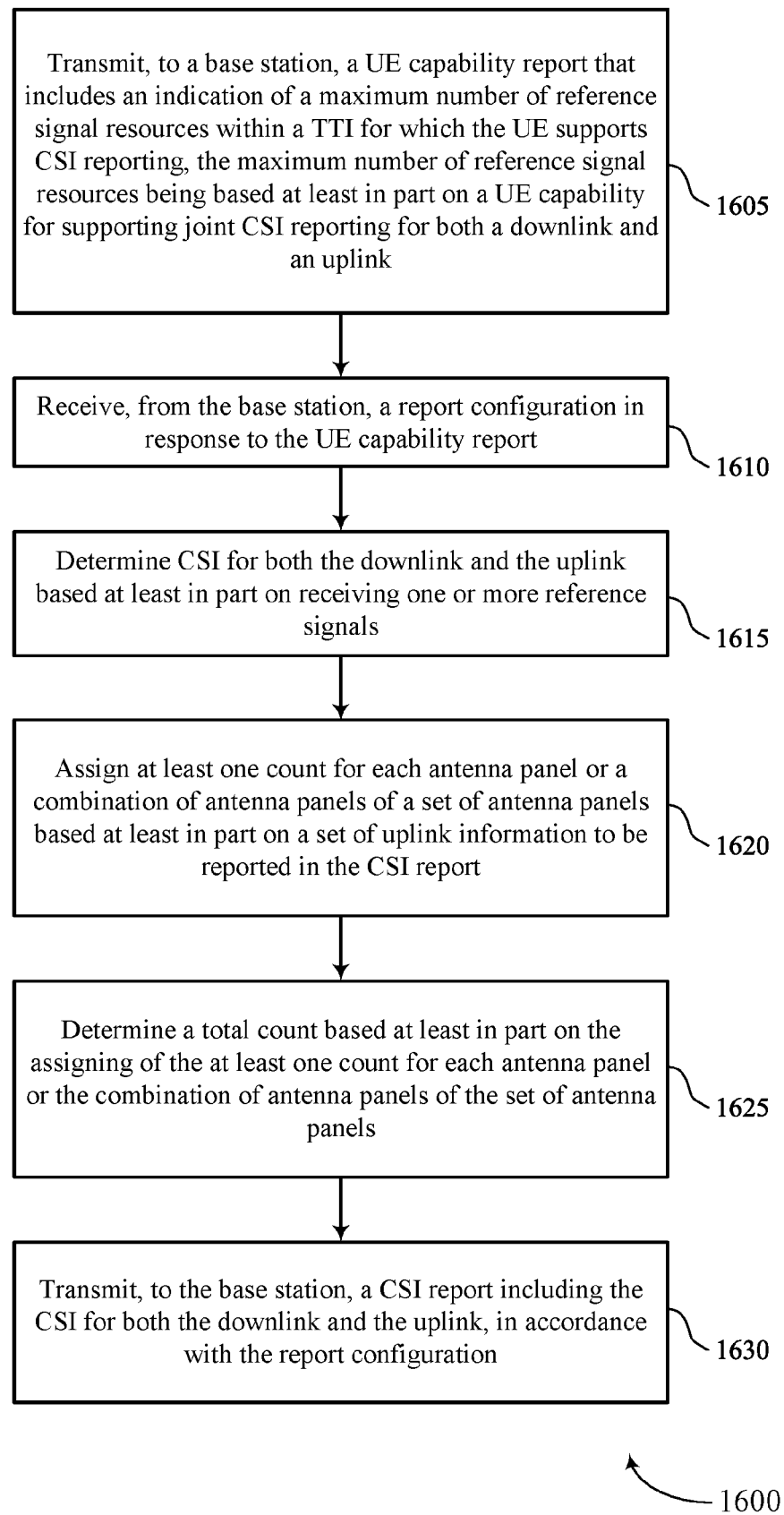

FIG. 16 shows a flowchart illustrating a method 1600 that supports counting active reference signals for a joint CSI report in accordance with aspects of the present disclosure. The operations of the method 1600 may be implemented by a UE or its components as described herein. For example, the operations of the method 1600 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a UE capability report that includes an indication of a maximum number of reference signal resources within a TTI for which the UE supports CSI reporting, the maximum number of reference signal resources being based on a UE capability for supporting joint CSI reporting for both a downlink and an uplink. In some examples, a set of uplink information to be reported in the CSI report corresponds to one or more antenna panels of a set of antenna panels. The operations of 1605 may be performed in accordance with examples as disclosed herein. In some examples, aspects of the operations of 1605 may be performed by a capability component 625 as described with reference to FIG. 6.

At 1610, the method may include receiving, from the base station, a report configuration in response to the UE capability report. The operations of 1610 may be performed in accordance with examples as disclosed herein. In some examples, aspects of the operations of 1610 may be performed by a configuration component 630 as described with reference to FIG. 6.

At 1615, the method may include determining CSI for both the downlink and the uplink based on receiving one or more reference signals. The operations of 1615 may be performed in accordance with examples as disclosed herein. In some examples, aspects of the operations of 1615 may be performed by a channel component 635 as described with reference to FIG. 6.

At 1620, the method may include assigning at least one count for each antenna panel or a combination of antenna panels of a set of antenna panels based on a set of uplink information to be reported in the CSI report. The operations of 1620 may be performed in accordance with examples as disclosed herein. In some examples, aspects of the operations of 1620 may be performed by a count component 645 as described with reference to FIG. 6.

At 1625, the method may include determining a total count based on the assigning of the at least one count for each antenna panel or the combination of antenna panels of the set of antenna panels. The operations of 1625 may be performed in accordance with examples as disclosed herein. In some examples, aspects of the operations of 1625 may be performed by a count component 645 as described with reference to FIG. 6.

At 1630, the method may include transmitting, to the base station, a CSI report including the CSI for both the downlink and the uplink, in accordance with the report configuration. The operations of 1630 may be performed in accordance with examples as disclosed herein. In some examples, aspects of the operations of 1630 may be performed by a report component 640 as described with reference to FIG. 6.

Figure 17:
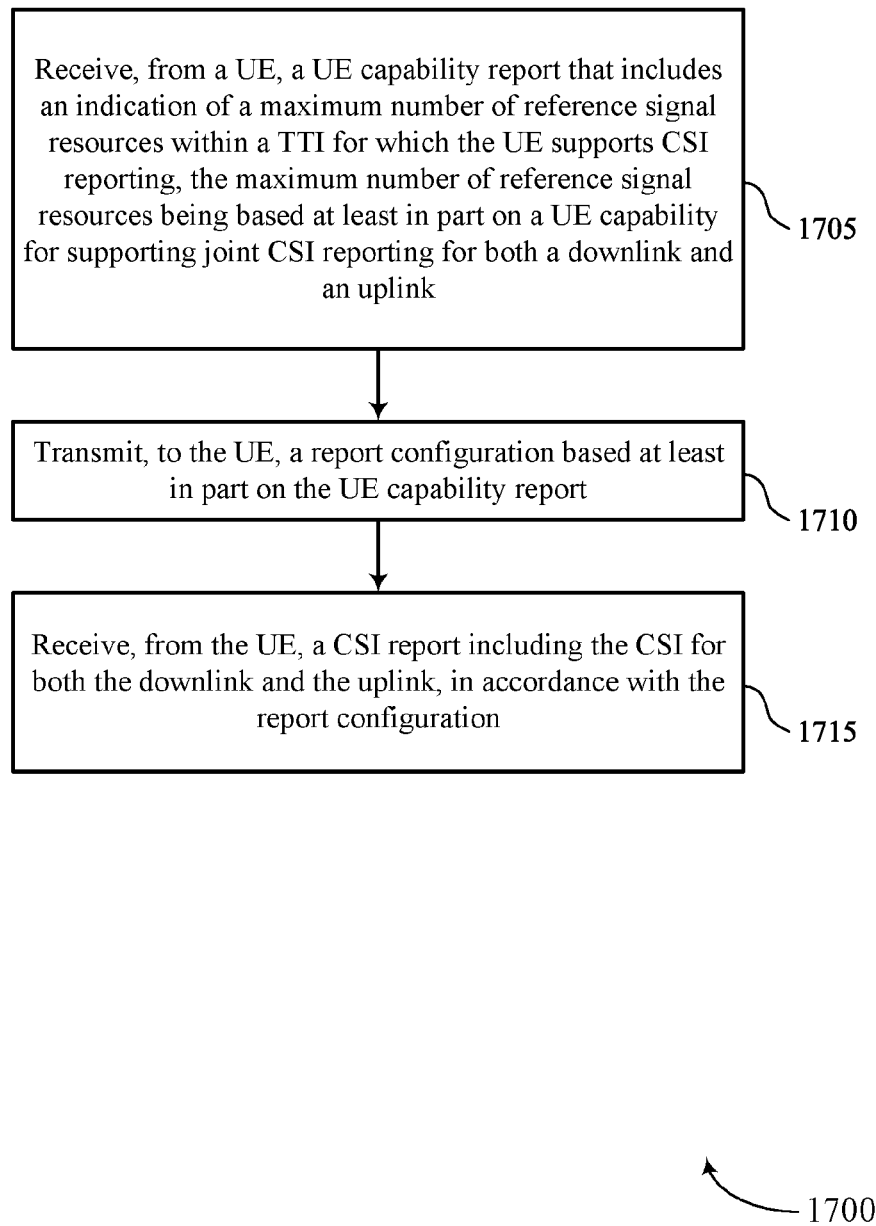

FIG. 17 shows a flowchart illustrating a method 1700 that supports counting active reference signals for a joint CSI report in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a UE capability report that includes an indication of a maximum number of reference signal resources within a TTI for which the UE supports CSI reporting, the maximum number of reference signal resources being based on a UE capability for supporting joint CSI reporting for both a downlink and an uplink. The operations of 1705 may be performed in accordance with examples as disclosed herein. In some examples, aspects of the operations of 1705 may be performed by a capability component 1025 as described with reference to FIG. 10.

At 1710, the method may include transmitting, to the UE, a report configuration based on the UE capability report. The operations of 1710 may be performed in accordance with examples as disclosed herein. In some examples, aspects of the operations of 1710 may be performed by a configuration component 1030 as described with reference to FIG. 10.

At 1715, the method may include receiving, from the UE, a CSI report including the CSI for both the downlink and the uplink, in accordance with the report configuration. The operations of 1715 may be performed in accordance with examples as disclosed herein. In some examples, aspects of the operations of 1715 may be performed by a report component 1035 as described with reference to FIG. 10.

The following provides an overview of aspects of the present disclosure:

Aspect 1: A method for wireless communication at a UE, comprising: transmitting, to a base station, a UE capability report that includes an indication of a maximum number of reference signal resources within a TTI for which the UE supports CSI reporting, the maximum number of reference signal resources being based at least in part on a UE capability for supporting joint CSI reporting for both a downlink and an uplink; receiving, from the base station, a report configuration in response to the UE capability report; determining CSI for both the downlink and the uplink based at least in part on receiving one or more reference signals; and transmitting, to the base station, a CSI report including the CSI for both the downlink and the uplink, in accordance with the report configuration.

Aspect 2: The method of aspect 1, further comprising: assigning at least one count for each reference signal resource of the report configuration associated with the joint CSI reporting for both the downlink and the uplink.

Aspect 3: The method of any of aspects 1 through 2, further comprising: assigning at least two counts for each reference signal resource of the report configuration associated with the joint CSI reporting for both the downlink and the uplink, wherein a first count of the at least two counts corresponds to the downlink and a second count of the at least two counts corresponds to the uplink.

Aspect 4: The method of aspect 3, wherein the second count is based at least in part on an amount of uplink information to be reported in the CSI report.

Aspect 5: The method of aspect 4, wherein the amount of uplink information to be reported in the CSI report corresponds to a number of antenna panels, the method further comprising: assigning at least one count for each antenna panel of the number of antenna panels based at least in part on the amount of uplink information; and determining a total count based at least in part on the assigning of the at least one count for each antenna panel of the number of antenna panels, wherein the second count comprises the total count.

Aspect 6: The method of any of aspects 3 through 5, wherein the second count is based at least in part on a set of uplink information to be reported in the CSI report.

Aspect 7: The method of aspect 6, wherein the set of uplink information to be reported in the CSI report corresponds to one or more antenna panels of a set of antenna panels, the method further comprising: assigning at least one count for each antenna panel or a combination of antenna panels of the set of antenna panels based at least in part on the set of uplink information to be reported in the CSI report; and determining a total count based at least in part on the assigning of the at least one count for each antenna panel or the combination of antenna panels of the set of antenna panels, wherein the second count comprises the total count.

Aspect 8: The method of any of aspects 1 through 7, wherein the maximum number of reference signal resources includes CSI-RS resources, reference signal ports, or both, for the downlink and the uplink.

Aspect 9: The method of any of aspects 1 through 8, wherein the maximum number of reference signal resources includes SSB resources for the downlink and the uplink.

Aspect 10: The method of any of aspects 1 through 9, wherein the maximum number of reference signal resources supported by the UE is for joint CSI reporting for both the downlink and the uplink on a per component carrier basis or on a per radio frequency spectrum band basis.

Aspect 11: The method of any of aspects 1 through 10, wherein the maximum number of reference signal resources supported by the UE is for joint CSI reporting for both the downlink and the uplink across a set of component carriers or across a set of radio frequency spectrum bands.

Aspect 12: A method for wireless communication at a base station, comprising: receiving, from a UE, a UE capability report that includes an indication of a maximum number of reference signal resources within a TTI for which the UE supports CSI reporting, the maximum number of reference signal resources being based at least in part on a UE capability for supporting joint CSI reporting for both a downlink and an uplink; transmitting, to the UE, a report configuration based at least in part on the UE capability report; receiving, from the UE, a CSI report including the CSI for both the downlink and the uplink, in accordance with the report configuration.

Aspect 13: The method of aspect 12, wherein the maximum number of reference signal resources includes CSI-RS resources, reference signal ports, or both, for the downlink and the uplink.

Aspect 14: The method of any of aspects 12 through 13, wherein the maximum number of reference signal resources includes SSB resources for the downlink and the uplink.

Aspect 15: The method of any of aspects 12 through 14, wherein the maximum number of reference signal resources supported by the UE is for joint CSI reporting for both the downlink and the uplink on a per component carrier basis or on a per radio frequency spectrum band basis.

Aspect 16: The method of any of aspects 12 through 15, wherein the maximum number of reference signal resources supported by the UE is for joint CSI reporting for both the downlink and the uplink across a set of component carriers or across a set of radio frequency spectrum bands.

Aspect 17: An apparatus for wireless communication, comprising a processor; memory coupled with the processor; and instructions stored in the memory and executable by the processor to cause the apparatus to perform a method of any of aspects 1 through 11.

Aspect 18: An apparatus for wireless communication, comprising at least one means for performing a method of any of aspects 1 through 11.

Aspect 19: A non-transitory computer-readable medium storing code for wireless communication at a UE, the code comprising instructions executable by a processor to perform a method of any of aspects 1 through 11.

Aspect 20: An apparatus for wireless communication, comprising a processor; memory coupled with the processor; and instructions stored in the memory and executable by the processor to cause the apparatus to perform a method of any of aspects 12 through 16.

Aspect 21: An apparatus for wireless communication, comprising at least one means for performing a method of any of aspects 12 through 16.

Aspect 22: A non-transitory computer-readable medium storing code for wireless communication at a base station, the code comprising instructions executable by a processor to perform a method of any of aspects 12 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a base station, a UE capability report that includes an indication of a maximum number of reference signal resources within a transmission time interval for which the UE supports channel state information reporting, the maximum number of reference signal resources being based at least in part on a UE capability for supporting joint channel state information reporting for both a downlink and an uplink;
    receiving, from the base station, a report configuration in response to the UE capability report;
    determining channel state information for both the downlink and the uplink based at least in part on receiving one or more reference signals; and
    transmitting, to the base station, a channel state information report including the channel state information for both the downlink and the uplink, in accordance with the report configuration.

2. The method of claim 1, further comprising:
    assigning at least one count for each reference signal resource of the report configuration associated with the joint channel state information reporting for both the downlink and the uplink.

3. The method of claim 1, further comprising:
    assigning at least two counts for each reference signal resource of the report configuration associated with the joint channel state information reporting for both the downlink and the uplink,
    wherein a first count of the at least two counts corresponds to the downlink and a second count of the at least two counts corresponds to the uplink.

4. The method of claim 3, wherein the second count is based at least in part on an amount of uplink information to be reported in the channel state information report.

5. The method of claim 4, wherein the amount of uplink information to be reported in the channel state information report corresponds to a number of antenna panels, the method further comprising:
    assigning at least one count for each antenna panel of the number of antenna panels based at least in part on the amount of uplink information; and
    determining a total count based at least in part on the assigning of the at least one count for each antenna panel of the number of antenna panels, wherein the second count comprises the total count.

6. The method of claim 3, wherein the second count is based at least in part on a set of uplink information to be reported in the channel state information report.

7. The method of claim 6, wherein the set of uplink information to be reported in the channel state information report corresponds to one or more antenna panels of a set of antenna panels, the method further comprising:
    assigning at least one count for each antenna panel or a combination of antenna panels of the set of antenna panels based at least in part on the set of uplink information to be reported in the channel state information report; and
    determining a total count based at least in part on the assigning of the at least one count for each antenna panel or the combination of antenna panels of the set of antenna panels, wherein the second count comprises the total count.

8. The method of claim 1, wherein the maximum number of reference signal resources includes channel state information reference signal resources, reference signal ports, or both, for the downlink and the uplink.

9. The method of claim 1, wherein the maximum number of reference signal resources includes synchronization signal block resources for the downlink and the uplink.

10. The method of claim 1, wherein the maximum number of reference signal resources supported by the UE is for the joint channel state information reporting for both the downlink and the uplink on a per component carrier basis or on a per radio frequency spectrum band basis.

11. The method of claim 1, wherein the maximum number of reference signal resources supported by the UE is for the joint channel state information reporting for both the downlink and the uplink across a set of component carriers or across a set of radio frequency spectrum bands.

12. A method for wireless communication at a base station, comprising:
receiving, from a user equipment (UE), a UE capability report that includes an indication of a maximum number of reference signal resources within a transmission time interval for which the UE supports channel state information reporting, the maximum number of reference signal resources being based at least in part on a UE capability for supporting joint channel state information reporting for both a downlink and an uplink;
transmitting, to the UE, a report configuration based at least in part on the UE capability report; and
receiving, from the UE, a channel state information report including the channel state information for both the downlink and the uplink, in accordance with the report configuration.

13. The method of claim 12, wherein the maximum number of reference signal resources includes channel state information reference signal resources, reference signal ports, or both, for the downlink and the uplink.

14. The method of claim 12, wherein the maximum number of reference signal resources includes synchronization signal block resources for the downlink and the uplink.

15. The method of claim 12, wherein the maximum number of reference signal resources supported by the UE is for the joint channel state information reporting for both the downlink and the uplink on a per component carrier basis or on a per radio frequency spectrum band basis.

16. The method of claim 12, wherein the maximum number of reference signal resources supported by the UE is for the joint channel state information reporting for both the downlink and the uplink across a set of component carriers or across a set of radio frequency spectrum bands.

17. An apparatus for wireless communication, comprising:
a processor;
memory coupled with the processor; and
instructions stored in the memory and executable by the processor to cause the apparatus to:
transmit, to a base station, a capability report that includes an indication of a maximum number of reference signal resources within a transmission time interval for which the UE supports channel state information reporting, the maximum number of reference signal resources being based at least in part on a capability for supporting joint channel state information reporting for both a downlink and an uplink;
receive, from the base station, a report configuration in response to the capability report;
determine channel state information for both the downlink and the uplink based at least in part on receiving one or more reference signals; and
transmit, to the base station, a channel state information report including the channel state information for both the downlink and the uplink, in accordance with the report configuration.

18. The apparatus of claim 17, wherein the instructions are further executable by the processor to cause the apparatus to:
assign at least one count for each reference signal resource of the maximum number of reference signal resources associated with the joint channel state information reporting for both the downlink and the uplink.

19. The apparatus of claim 17, wherein the instructions are further executable by the processor to cause the apparatus to:
assign at least two counts for each active reference signal resource of maximum number of reference signal resources associated with the joint channel state information reporting for both the downlink and the uplink, wherein a first count of the at least two count corresponds to the downlink and a second count of the at least two counts corresponds to the uplink.

20. The apparatus of claim 19, wherein the second count is based at least in part on an amount of uplink information to be reported in the channel state information report.

21. The apparatus of claim 20, wherein the amount of uplink information to be reported in the channel state information report corresponds to a number of antenna panels, and the instructions are further executable by the processor to cause the apparatus to:
assign at least one count for each antenna panel of the number of antenna panels based at least in part on the amount of uplink information; and
determine a total count based at least in part on the assigning of the at least one count for each antenna panel of the number of antenna panels, wherein the second count comprises the total count.

22. The apparatus of claim 19, wherein the second count is based at least in part on a set of uplink information to be reported in the channel state information report.

23. The apparatus of claim 22, wherein the set of uplink information to be reported in the channel state information report corresponds to one or more antenna panels of a set of antenna panels, and the instructions are further executable by the processor to cause the apparatus to:
assign at least one count for each antenna panel or a combination of antenna panels of the set of antenna panels based at least in part on the set of uplink information to be reported in the channel state information report; and
determine a total count based at least in part on the assigning of the at least one count for each antenna panel or the combination of antenna panels of the set of antenna panels, wherein the second count comprises the total count.

24. The apparatus of claim 17, wherein the maximum number of reference signal resources includes channel state information reference signal resources, reference signal ports, or both, for the downlink and the uplink.

25. The apparatus of claim 17, wherein the maximum number of reference signal resources includes synchronization signal block resources for the downlink and the uplink.

26. The apparatus of claim 17, wherein the maximum number of reference signal resources supported by the apparatus is for the joint channel state information reporting for both the downlink and the uplink on a per component carrier basis or on a per radio frequency spectrum band basis.

27. The apparatus of claim 17, wherein the maximum number of reference signal resources supported by the apparatus is for the joint channel state information reporting for both the downlink and the uplink across a set of component carriers or across a set of radio frequency spectrum bands.

28. An apparatus for wireless communication, comprising:
a processor;
memory coupled with the processor; and
instructions stored in the memory and executable by the processor to cause the apparatus to:
receive, from a user equipment (UE), a UE capability report that includes an indication of a maximum number of reference signal resources within a transmission time interval for which the UE supports channel state information reporting, the maximum number of reference signal resources being based at least in part on a UE capability for supporting joint channel state information reporting for both a downlink and an uplink;
transmit, to the UE, a report configuration based at least in part on the UE capability report;
receive, from the UE, a channel state information report including the channel state information for both the downlink and the uplink, in accordance with the report configuration.

29. The apparatus of claim 28, wherein the maximum number of reference signal resources includes channel state information reference signal resources, reference signal ports, or both, for the downlink and the uplink.

30. The apparatus of claim 28, wherein the maximum number of reference signal resources includes synchronization signal block resources for the downlink and the uplink.

* * * * *